(12) United States Patent
Lee et al.

(10) Patent No.: US 9,846,331 B2
(45) Date of Patent: Dec. 19, 2017

(54) LIQUID CRYSTAL DISPLAY

(71) Applicant: Samsung Display Co. Ltd., Yongin-Si (KR)

(72) Inventors: Se Hyun Lee, Seoul (KR); Cheol Shin, Hwaseong-si (KR); Hak Sun Chang, Yongin-si (KR); Ki Chul Shin, Seongnam-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/164,585

(22) Filed: May 25, 2016

(65) Prior Publication Data

US 2016/0363823 A1    Dec. 15, 2016

(30) Foreign Application Priority Data

Jun. 10, 2015 (KR) .................. 10-2015-0082131

(51) Int. Cl.
   *G02F 1/1337* (2006.01)
   *G02F 1/1343* (2006.01)

(52) U.S. Cl.
   CPC .. *G02F 1/133753* (2013.01); *G02F 1/133707* (2013.01); *G02F 1/134309* (2013.01); *G02F 2001/133757* (2013.01)

(58) Field of Classification Search
   CPC ......... G02F 1/133707; G02F 1/134309; G02F 1/133753; G02F 2001/133757
   See application file for complete search history.

(56) References Cited

U.S. PATENT DOCUMENTS

| 2010/0157232 A1* | 6/2010 | Kim ..................... G02F 1/1393 349/144 |
| 2013/0242239 A1* | 9/2013 | Chang ............... G02F 1/133707 349/106 |
| 2014/0168582 A1* | 6/2014 | Chang ............... G02F 1/134309 349/106 |
| 2014/0267994 A1* | 9/2014 | Ryu .................. G02F 1/133707 349/141 |

(Continued)

FOREIGN PATENT DOCUMENTS

| KR | 1020080028565 | 4/2008 |
| KR | 1020110111227 | 10/2011 |
| KR | 1020130104224 | 9/2013 |

(Continued)

*Primary Examiner* — Jia Pan
(74) *Attorney, Agent, or Firm* — Cantor Colburn LLP

(57) ABSTRACT

A liquid crystal display includes a first panel including a first electrode, which includes side electrodes in edge areas of a pixel, a central electrode connected to the side electrodes and disposed in a central area of the pixel, and fine branches, some of which are connected to the side electrode, a second panel in which a cutout, which corresponds to the first electrode and divides the fine branches, the central electrode and the side electrode into domains is defined, and which includes a second electrode, which is separated by the cutout and corresponds to each of the domains, where second slit patterns, which are provided by partially cutting out ends of the fine branches, separate the side electrodes and the fine branches from each other, and extend in parallel to a longitudinal direction of the side electrodes are defined in the first panel.

19 Claims, 16 Drawing Sheets

(56) References Cited

U.S. PATENT DOCUMENTS

2016/0195781 A1 7/2016 Lee et al.
2016/0246089 A1 8/2016 Jeong et al.

FOREIGN PATENT DOCUMENTS

| KR | 1020130104521 | 9/2013 |
| KR | 1020140113035 | 9/2014 |
| KR | 1020150019131 | 2/2015 |
| KR | 1020160084555 | 7/2016 |
| KR | 1020160103243 | 9/2016 |

* cited by examiner

LIQUID CRYSTAL DISPLAY

This application claims priority to Korean Patent Application No. 10-2015-0082131 filed on Jun. 10, 2015, and all the benefits accruing therefrom under 35 U.S.C. §119, the content of which in its entirety is herein incorporated by reference.

BACKGROUND

1. Field

The exemplary embodiments of the invention relate to a liquid crystal display ("LCD").

2. Description of the Related Art

A liquid crystal display ("LCD") is one of the most widely used flat panel displays. An LCD includes two panels provided with field-generating electrodes such as pixel electrodes and a common electrode and a liquid crystal layer interposed therebetween. The LCD displays images by applying voltages to the field-generating electrodes to generate an electric field, which determines the orientation of liquid crystal molecules in the liquid crystal layer to adjust polarization of incident light.

One type of the LCD is a vertical alignment ("VA")-mode LCD, which aligns liquid crystal molecules such that the longitudinal axes of the liquid crystal molecules are perpendicular to the panels in the absence of an electric field, is spotlighted because of its high contrast ratio and wide reference viewing angle.

The wide reference viewing angle of the VA-mode LCD can be realized by forming a plurality of domains that differ from one another in terms of the orientation of the liquid crystal molecules in one pixel.

To form the plurality of domains in one pixel, there has been suggested a method of forming cutouts such as minute slits in the field-generating electrodes or forming protrusions on the field-generating electrodes. In this method, the plurality of domains may be provided by realigning the liquid crystal molecules perpendicular with respect to fringe fields generated between edges of the cutouts or protrusions, and the field-generating electrodes facing the edges.

Examples of an LCD with means for forming domains include a VA-mode LCD in which means for forming domains is provided on both upper and lower panels and a patternless VA ("PVA")-mode LCD in which minute patterns are disposed on a lower panel, but not on an upper panel. A display area is divided into a plurality of domains by the means for forming domains, and liquid crystal molecules in each of the domains are tilted mostly in the same direction.

The VA-mode LCD, which aligns liquid crystal molecules such that the long axes of the liquid crystal molecules are perpendicular to the panels in the absence of an electric field, is popular for its high contrast ratio and wide reference viewing angle, which is defined as a viewing angle making a contrast ratio equal to 1:10 or as a limit angle for the inversion of luminance between grayscale levels.

In the VA-mode LCD, the securing of a wide viewing angle is critical. The wide viewing angle of the VA mode LCD can be realized by forming cutouts such as minute slits in the field-generating electrodes or forming protrusions on the field-generating electrodes. The cutouts and the protrusions can determine the tilt direction of liquid crystal molecules, which can be distributed into varying directions to widen the reference viewing angle.

SUMMARY

A vertical alignment ("VA")-mode liquid crystal display ("LCD") has poor side visibility as compared with front visibility. To overcome the above described drawback, a method has been suggested in which a pixel electrode is divided into two sub-pixel electrodes and a high voltage and a low voltage are respectively applied to the two sub-pixel electrodes such that the orientation of liquid crystal molecules can vary from one sub-pixel electrode to another sub-pixel electrode, and that the visibility in a left-to-right viewing angle direction can be improved.

Exemplary embodiments of the invention provide an LCD with improved visibility and transmittance.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, an LCD, comprising a first panel including a first electrode, which comprises side electrodes that are disposed in edge areas of a pixel, a central electrode that is connected to the side electrodes and is disposed in a central area of the pixel, and fine branches, some of which are connected to the side electrode, a second panel including a cutout, which corresponds to the first electrode and divides the fine branches, the central electrode and the side electrode into a plurality of domains, and a second electrode, which is separated by the cutout and corresponds to each of the domains, and a liquid crystal layer disposed between the first and second panels and including liquid crystal molecules, wherein the first panel further includes second slit patterns, which are provided by partially cutting out ends of the fine branches, separate the side electrodes and the fine branches from each other, and extend in parallel to a longitudinal direction of the side electrodes.

In an exemplary embodiment, the fine branches may be disposed in each of the domains and include a plurality of branch electrodes and the branch electrodes include first slit patterns, which are provided by removing parts of the pixel between the branch electrodes and separate the branch electrodes from one another.

In an exemplary embodiment, the branch electrodes and the first slit patterns in one of the domains may be asymmetrical to the branch electrodes and the first slit patterns in another one of the domains.

In an exemplary embodiment, the side electrodes may be disposed on at least one of the left and right sides and the top and the bottom sides of the pixel, and the second slit patterns, which separate the side electrodes and the fine branches from each other, are disposed in at least one of the domains.

In an exemplary embodiment, a width of the side electrodes and the second slit patterns may be in the range of about 7 micrometers (μm) to about 9 μm.

In an exemplary embodiment, a distance between the side electrodes and the branch electrodes may be in the range of about 3 μm to about 5 μm.

In an exemplary embodiment, a width of the second silt patterns may be in the range of about 3 μm to about 5 μm.

In an exemplary embodiment, the branch electrodes and the first slit patterns may be disposed at a pitch of about 6 μm to about 10 μm.

In an exemplary embodiment, a length to which the fine branches extend from one side of the central electrode to the pixel may be about 30 μm or less.

In an exemplary embodiment, the second slit patterns may be disposed between every other pair of branch electrodes.

In an exemplary embodiment, the central electrode may be provided in one of a polygonal shape, including the shapes of a cross, a rhombus, a rectangle, and an octagon, a circular shape and a combination thereof.

In an exemplary embodiment, the branch electrodes and the first slit patterns in one of the domains may be arranged in an alternate manner in a pair of adjacent domains.

In an exemplary embodiment, the second electrode may include a horizontal cutout portion, which horizontally divides the domains across the central electrode, and a vertical cutout portion, which intersects the horizontal cutout portion and vertically divides the domains across the central electrode.

In an exemplary embodiment, the first electrode is disposed between the central electrode and the side electrodes and further may include a connecting electrode, which is disposed in an area corresponding to the cutout.

In an exemplary embodiment, a width of the cutout may be in the range of about 2 μm to about 5 μm.

In an exemplary embodiment, the first electrode further may includes first areas in which parts of the fine branches adjacent to the central electrode are located and second areas which are apart from the central electrode and in which at least one of the side electrodes is disposed at the ends of at least one of the fine branches, and the second slit patterns are disposed near at least one of the second areas and rotate liquid crystal molecules in the second areas in a direction similar to a direction of an average azimuth angle of liquid crystal molecules in the first areas.

In an exemplary embodiment, a direction in which the branch electrodes extend may be the same as a direction of an average azimuth angle of the liquid crystal molecules.

In an exemplary embodiment, The LCD further comprising: first and second polarizing plates, which may be disposed on the first and second panels, respectively, wherein a direction in which the branch electrodes extend is in the range of angles of about 30 degrees (°) to about 60° relative to a polarization axis of the first and second polarizing plates.

In an exemplary embodiment, the second slit patterns may be arranged in an alternate manner in a pair of adjacent pixels.

In an exemplary embodiment, a width of the branch electrodes is the same as a width of the first silt patterns.

According to the exemplary embodiments, it is possible to improve the visibility and transmittance of an LCD by defining, in each pixel, slit patterns that define the shape of electrodes and separate the electrodes from one another.

Other features and exemplary embodiments will be apparent from the following detailed description, the drawings, and the claims.

BRIEF DESCRIPTION OF THE DRAWINGS

The above and other exemplary embodiments, advantages and features of this invention will become more apparent by describing in further detail exemplary embodiments thereof with reference to the accompanying drawings, in which.

DETAILED DESCRIPTION

Figure 1:
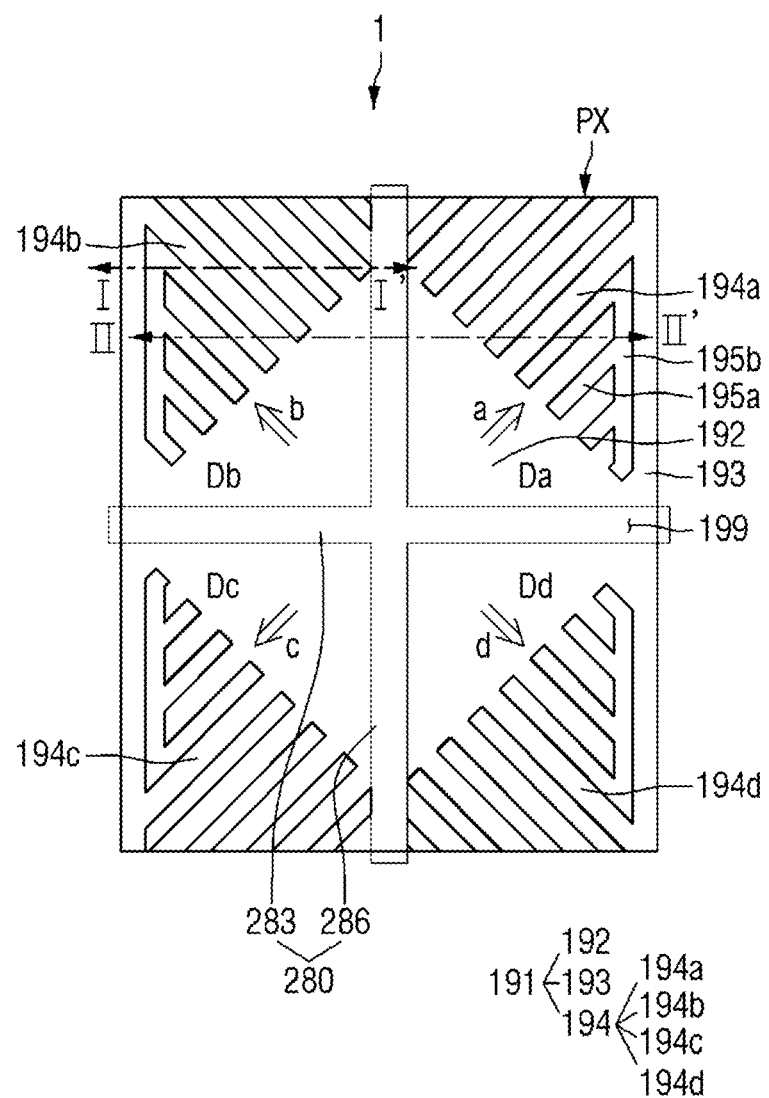
FIG. 1 is a schematic plan view illustrating an exemplary embodiment of a pixel of a liquid crystal display ("LCD") according to the invention.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments of the invention will now be explained with reference to the drawings.

Figure 2:
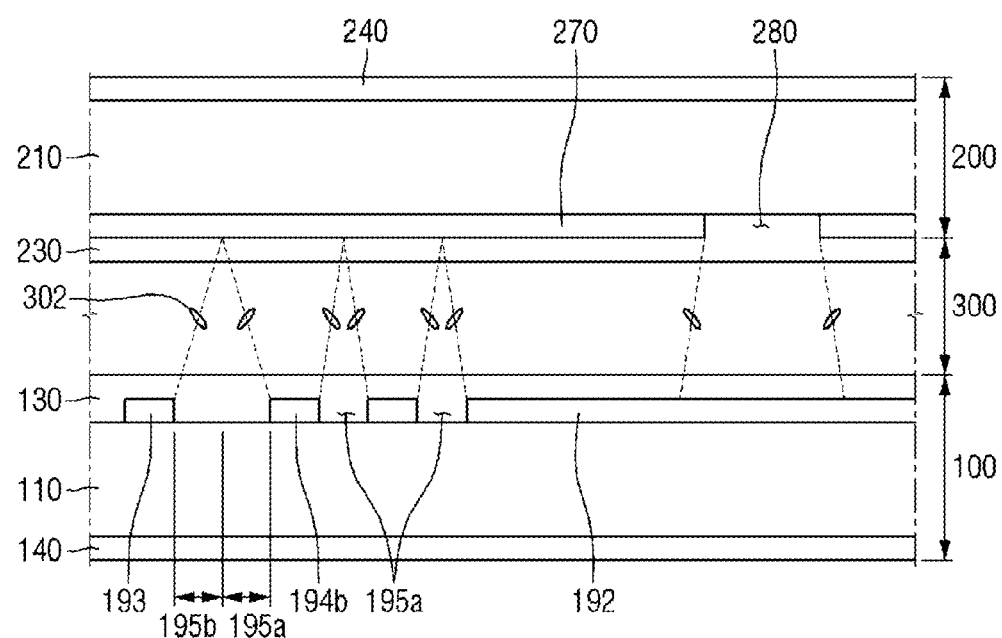
FIG. 2 is a schematic cross-sectional view taken along line I-I' of FIG. 1.
Figure 3:
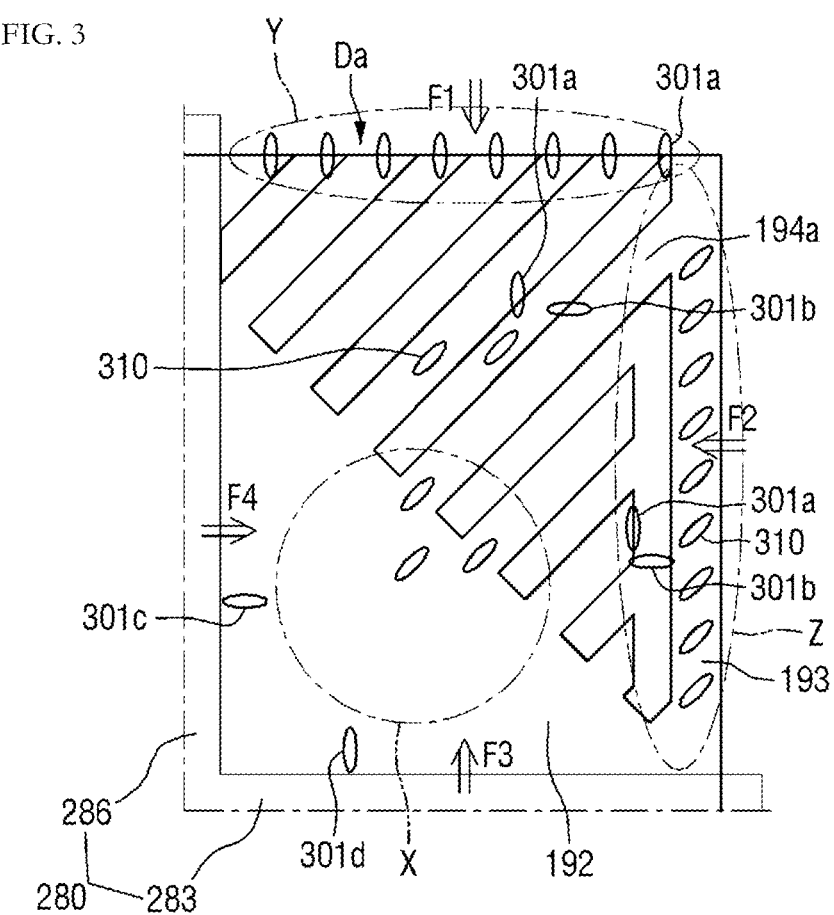
FIG. 3 is an enlarged plan view illustrating an example of a domain illustrated in FIG. 1.
Figure 4:
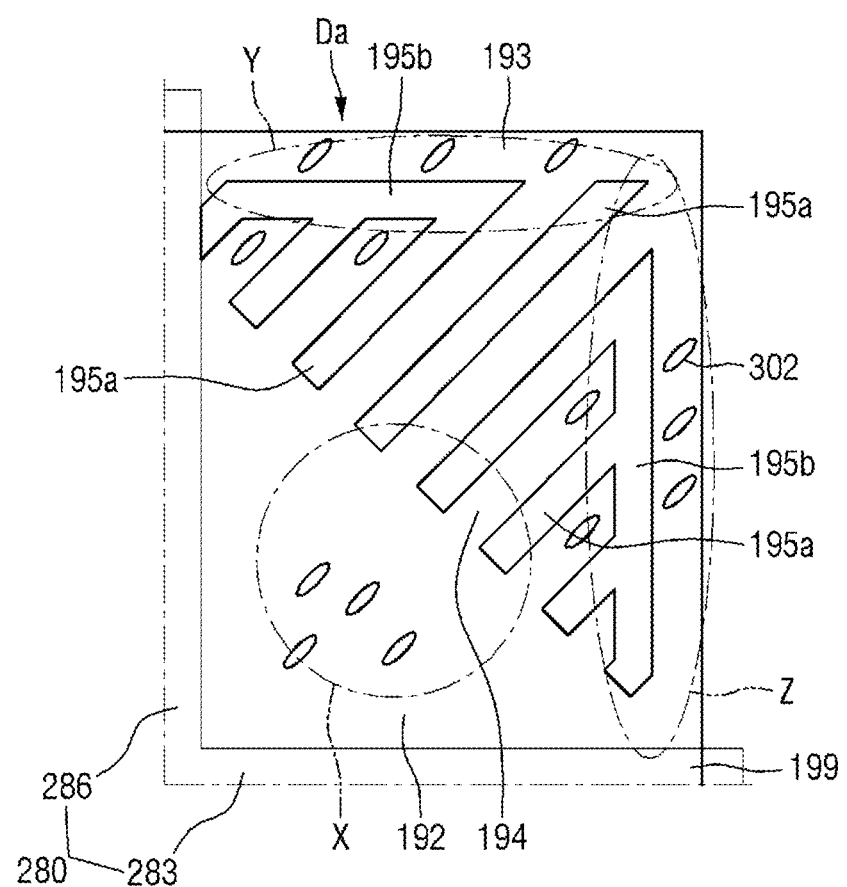
FIG. 4 is an enlarged plan view illustrating another example of a domain illustrated in FIG. 1.
Figure 5:
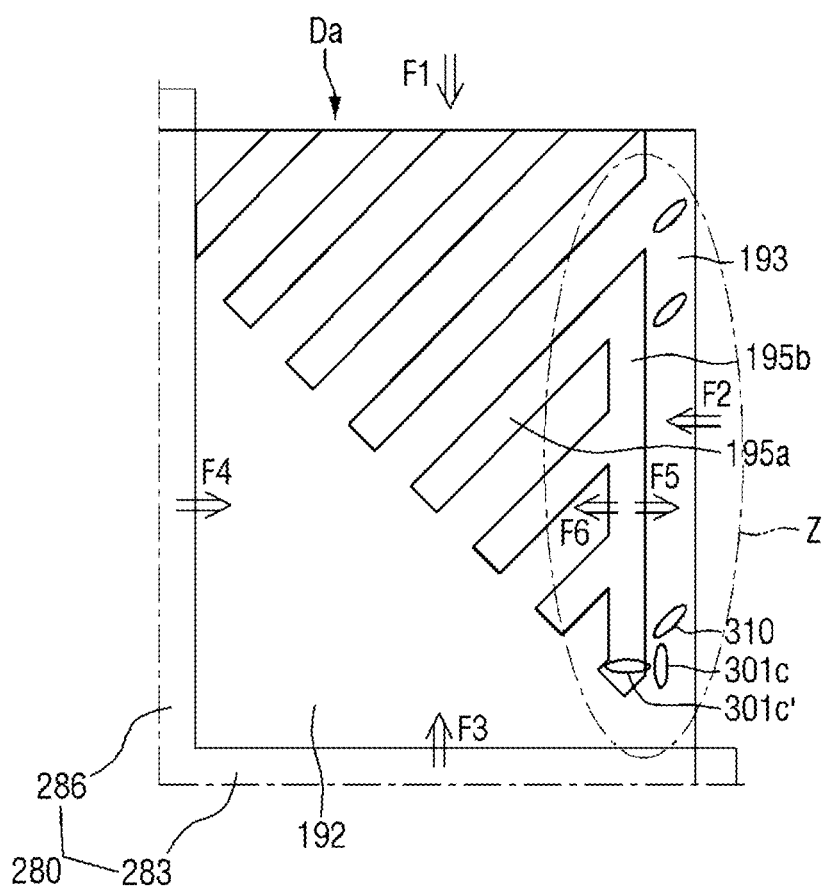
FIG. 5 is a diagram illustrating the behavior of liquid crystal molecules of the LCD of FIG. 1.

FIG. 1 is a schematic plan view illustrating a pixel of a liquid crystal display ("LCD") according to an exemplary embodiment of the invention, FIG. 2 is a schematic cross-sectional view taken along line I-I' of FIG. 1, FIG. 3 is an enlarged plan view illustrating an example of a domain illustrated in FIG. 1, FIG. 4 is an enlarged plan view illustrating another example of the domain illustrated in FIG. 1, and FIG. 5 is a diagram illustrating the behavior of liquid crystal molecules of the LCD of FIG. 1.

FIGS. 1 to 5 illustrate a pixel PX of the LCD according to the illustrated exemplary embodiment, but the LCD according to the illustrated exemplary embodiment may include a plurality of pixels, which are arranged in rows and columns.

Referring to FIGS. 1 and 2, an LCD 1 includes first and second panels 100 and 200, which face each other, and a liquid crystal layer 300, which is disposed between the first and second panels 100 and 200.

The first panel 100 may include a first substrate 110, a first electrode 191 and a first alignment layer 130, which are sequentially disposed on one surface of the first substrate 110, and a first polarizing plate 140, which is disposed on the other surface of the first substrate 110. In an exemplary embodiment, the first electrode 191 included in the first panel 100 may be, for example, a pixel electrode.

The second panel 200 may include a second substrate 210, a second electrode 270 and a second alignment layer 230, which are sequentially disposed on one surface of the second substrate 210, and a second polarizing plate 240, which is disposed on the other surface of the second substrate 210. In an exemplary embodiment, the second electrode 270 included in the second panel 200 may be, for example, a common electrode.

In an exemplary embodiment, the pixel PX may have a substantially rectangular shape, for example. The pixel electrode 191 may be disposed to cover the pixel PX, and the common electrode 270 may be integrally disposed on the entire surface of the second panel 200. A cutout 280 may be defined in part of the common electrode 270, but the invention is not limited thereto.

The first panel 100 or the second panel 200 may also include a switching device (not illustrated), a color filter (not illustrated), and a light-shielding member (not illustrated). In an exemplary embodiment, one of the first and second polarizing plates 140 and 240 may be optional. In an exemplary embodiment, one or both of the first and second alignment layers 130 and 230 may be optional.

The liquid crystal layer 300 may include liquid crystal molecules with negative dielectric anisotropy or with positive dielectric anisotropy or liquid crystal molecules with positive dielectric anisotropy or with positive dielectric anisotropy. In the illustrated exemplary embodiment, the liquid crystal layer 300 may include liquid crystal molecules 302 with negative dielectric anisotropy, for example. The longitudinal axes of the liquid crystal molecules 302 of the liquid crystal layer 300 may be vertically aligned with respect to the surfaces of the alignment layers 130 and 230 in the absence of an electric field between the first and second electrodes 191 and 270. In an alternative exemplary embodiment, the liquid crystal molecules 302 may be aligned to have a pretilt angle with respect to a direction of the thickness of the liquid crystal layer 300.

In response to a potential difference being generated between the pixel electrode 191 and the common electrode 260 so as to generate an electric field in the liquid crystal layer 300, the liquid crystal molecules 302 may be aligned such that their longitudinal axes may become perpendicular to the electric field. The degree of the polarization of light incident upon the liquid crystal layer 300 may vary according to the degree to which the liquid crystal molecules 302 are tilted, and variations in the polarization of the incident light may appear as variations in transmittance due to the first and second polarizing plates 140 and 240, and as a result, the LCD 1 may display an image.

To improve the viewing angle of the LCD 1, which displays an image, patterns may be provided on the pixel electrode 191 and the common electrode 270 so as to define a plurality of domains.

More specifically, the pixel PX may include the common electrode 270, which corresponds to the pixel electrode 191, and the cutout 280, which may adjust the direction of an electric field, may be disposed on the common electrode 270 by cutting out a portion of the common electrode 270.

Accordingly, by patterning the pixel electrode 191 and the common electrode 270, the pixel PX may be divided into a plurality of domains where liquid crystal molecules 302 having different average azimuth angles are oriented in different directions. Liquid crystal molecules 302 having an average azimuth angle will hereinafter be referred to as an average azimuth angle 310.

In an exemplary embodiment, the pixel PX may include four domains, which are defined by a horizontal cutout portion 283 and a vertical cutout portion 286 of the common electrode 270, i.e., first to fourth domains Da to Dd. In an exemplary embodiment, the width of the cutout 280 may be about 2 micrometers (μm) to about 4.5 μm. When the width of the cutout 280 is about 2 μm to about 4.5 μm, the visibility of the LCD 1 may be improved without compromising the transmittance of the pixel PX. When the width of the cutout 280 is about 6 μm or larger, a fringe field may increase along the boundaries between the first and fourth domains Da and Dd and between the second and third domains Db and Dc, and as a result, the transmittance of the pixel PX may decrease. Also, the liquid crystal molecules 302 may not be sufficiently laid down in the area where the cutout 280 is provided, and as a result, the transmittance of the pixel PX may decrease.

Due to the horizontal and vertical cutouts 283 and 286 of the common electrode 270, the pixel electrode 191 may be divided into the first to fourth domains Da to Dd.

The pixel electrode 191 may include, in each of the first to fourth domains Da to Dd, a side electrode 193, which is disposed in an edge area of the pixel PX, a central electrode 192, which is connected to the side electrode 193 and is disposed in a central area of the pixel PX, and fine branches 194, which extend from at least one of the sides of the central electrode 192 in one direction and some of which are connected to the side electrode 193. The fine branches 194 may include first branch electrodes 194a, second branch electrodes 194b, third branch electrodes 194c, and fourth branch electrodes 194d, which are disposed in the first, second, third, and fourth domains Da, Db, Dc, and Dd, respectively.

In each of the first to fourth domains Da to Dd, first slit patterns 195a, which are provided by removing parts of the pixel PX between the first, second, third, or fourth branch electrodes 194a, 194b, 194c, or 194d to expose an insulating layer therebelow, and separate the first, second, third, or fourth branch electrodes 194a, 194b, 194c, or 194d from one another, and a second slit pattern 195b, which separates at least one of the first, second, third, or fourth branch electrodes 194a, 194b, 194c, or 194d from the side electrode 193 may be defined in the pixel PX. The second slit pattern 195b may be provided by partially removing an end portion of at least one of the first, second, third, or fourth branch electrodes 194a, 194b, 194c or 194d to expose the insulating layer, which is disposed below the pixel electrode 191.

The side electrode 193 and one of the first, second, third, or fourth branch electrodes 194a, 194b, 194c or 194d may be connected to each other, and a connecting electrode 199 may be disposed at the boundary between the side electrode 193 and the central electrode 192 to overlap the horizontal and vertical cutouts 283 and 286. Accordingly, the central electrode 192, the fine branches 194 and the side electrode 193 of the pixel electrode 191 may be connected to one another.

The pixel electrode 191, which is disposed in the pixel PX, may include the central electrode 192, the fine branches 194, and the side electrode 193, and the central electrode 192, and the fine branches 194, and the side electrode 193 may be unitary and may thus receive the same voltage. The pixel electrode 191 may define a plurality of domains, i.e., the first to fourth domains Da to Dd, due to the horizontal and vertical cutouts 283 and 286.

In an exemplary embodiment, the central electrode 192 may be in the shape of a rhombus, for example, but the invention is not limited thereto. That is, the central electrode 192 may be provided in the same shape as that of the horizontal and vertical cutouts 283 and 286. The area of the central electrode 192 may vary, and the central electrode 192 may be provided to have a smaller area than that illustrated in FIG. 1.

The fine branches 194, which extend from the sides of the central electrode 192, may be disposed in the pixel PX. The fine branches 194 may include the first branch electrodes 194a, the second branch electrodes 194b, the third branch electrodes 194c, and the fourth branch electrodes 194d, which are disposed in the first, second, third, and fourth domains Da, Db, Dc, and Dd, respectively. The first branch electrodes 194a, the second branch electrodes 194b, the third branch electrodes 194c, and the fourth branch electrodes 194d will hereinafter be collectively referred to as the fine branches 194.

The first branch electrodes 194a may be disposed in the first domain Da and may diagonally extend from the horizontal or vertical cutout portion 283 or 286 in an upper right direction, and the second branch electrodes 194b may be disposed in the second domain Db and may diagonally extend from the horizontal or vertical cutout portion 283 or 286 in an upper left direction. The third branch electrodes 194c may be disposed in the third domain Dc and may diagonally extend from the horizontal or vertical cutout portion 283 or 286 in a lower left direction, and the fourth branch electrodes 194d may be disposed in the fourth domain Dd and may diagonally extend from the horizontal or vertical cutout portion 283 or 286 in a lower right direction.

In an exemplary embodiment, the first branch electrodes 194a and the second branch electrodes 194b may be disposed at an angle of about 45 degrees)(° or about 130° relative to the horizontal cutout portion 283, for example. In an exemplary embodiment, the third branch electrodes 194c and the fourth branch electrodes 194d may be disposed at an angle of about 225° or about 315° relative to the horizontal cutout portion 283, for example. Branch electrodes in one of a pair of adjacent domains may intersect branch electrodes in the other domain.

In response to the fine branches 194 extending from at least one of the sides of the central electrode 192 as described above, the control of the liquid crystal molecules 302 may be improved, texture may be reduced, and the transmittance and response speed of the LCD 1 may be improved. Particularly, the performance of the LCD 1 such as the control of the liquid crystal molecules 302 may be effectively improved when fine branches 194 corresponding to the edges of each sub-pixel electrode 191H or 191L (refer to FIG. 20) extend asymmetrically with respect to fine branches 194 not corresponding to the edges of each sub-pixel electrode 191H or 191L, i.e., when the branch electrodes 194a to 194d are disposed such that the ends of the branch electrodes 194a to 194d correspond to the first slit patterns 195a.

In each of the first to fourth domains Da to Dd, a second slit pattern 195b, which separates the end of at least one of the first, second, third, or fourth branch electrodes 194a, 194b, 194c, or 194d from the side electrode 193 may be defined in the pixel PX.

The first slit patterns 195a may be disposed in each of the first to fourth domains Da to Dd of the pixel PX and may define gaps among the branch electrodes 194 such that each pair of adjacent branch electrodes 194 is separated by a predetermined distance. The first slit patterns 195a may separate the branch electrodes 194 from one another, and the first slit patterns 195a and the branch electrodes 194 may be diagonally disposed with respect to the cutout 280. Accordingly, the liquid crystal molecules 302 may be aligned to have the average liquid azimuth angle 310 that achieves maximum transmittance.

The second slit pattern 195b may be connected to some of the first slit patterns 195a, and may be provided by removing end portions of at least some of the branch electrodes 194 near the side electrode 193, and may separate the side electrode 193 and the branch electrodes 194 from each other.

The second slit pattern 195b may be provided in at least one of the first to fourth domains Da to Dd. In the illustrated exemplary embodiment, the second slit pattern 195b may be disposed in each of the first to fourth domains Da to Dd to extend in parallel to the side electrode 193, but the invention is not limited thereto.

The second slit pattern 195b, which is disposed in at least one of the first to fourth domains Da to Dd, may not be provided in the connecting electrode 199, and may also not be provided between the side electrode 193 and at least some of the branch electrodes 194.

That is, the second slit pattern 195b may not be provided in an area where the connecting electrode 199 is provided to connect the central electrode 192 and the side electrode 193 or to connect the side electrode 193 and some of the branch electrodes 194, and may also not be provided between the side electrode 193 and at least some of the branch electrodes 194.

In the illustrated exemplary embodiment, the second slit pattern 195b may be bar-shaped, for example, and may be disposed near the side electrode 193 to extend in parallel to the side electrode 193, and the side electrode 193 and the branch electrodes 194 may be connected to each other at the corners of the pixel PX. Accordingly, the second slit pattern 195b may be provided throughout the entire pixel PX except for a corner area and the area where the connecting electrode 199 is provided.

In an alternative exemplary embodiment, the central electrode 192 and the branch electrodes 194 may be connected to each other and may also be connected to the side electrode 193 via the connecting electrode 199. In this alternative exemplary embodiment, the second slit pattern 195b may be also disposed in a corner area of the pixel PX.

In an exemplary embodiment, the first slit patterns 195a, the second slit pattern 195b, and the branch electrodes 194 may have the same width. The side electrode 193 may have the same width as that of the branch electrodes 194. Accordingly, the force of an electric field between the branch electrodes 194 may be similar to the force of an electric field between the side electrode 193 and the branch electrodes 194, and thus, the liquid crystal molecules 302 may be prevented from being tilted in any particular direction.

In an exemplary embodiment, the branch electrodes 194 and the first slit patterns 195a may be disposed at a pitch of about 6 μm to about 10 μm, for example. More specifically, the branch electrodes 194 and the first slit patterns 195a may be disposed at a pitch of about 7 μm to about 9 μm, for example. In an exemplary embodiment, the side electrode 193 and the end portions of the branch electrodes 194 may have a width of about 7 μm to about 9 μm, for example. In an exemplary embodiment, the distance between the side electrode 193 and the branch electrodes 194, i.e., the width of the second slit pattern 195b, may be in the range of about 3 μm to about 5 μm, for example.

In an exemplary embodiment, the length of the branch electrodes 194, i.e., the length to which the branch electrodes 194 extend from one side of the central electrode 192 to the pixel PX, may be about 30 μm or less, for example.

Assuming that liquid crystal molecules 302 having an average alignment direction, which is obtained by averaging the alignment directions of liquid crystal molecules 302 in the first, second, third, or fourth domain Da, Db, Dc, or Dd, are the average azimuth angle of an average alignment direction 310, the average azimuth angle of an average alignment direction 310 may be tilted in a direction corresponding to the sum of the vector of an electric field generated in each of the first, second, third, or fourth domain Da, Db, Dc, or Dd due to an electric field and a vector provided by collisions between the liquid crystal molecules 302. That is, the liquid crystal molecules 302 may define an azimuth angle similar to a direction in which the first, second, third, or fourth branch electrodes 194a, 194b, 194c, or 194d extend. In each of the first to fourth domains Da to Dd, the liquid crystal molecules 302 may be aligned to have an average azimuth angle 310 corresponding to a direction a, b, c, or d.

More specifically, the liquid crystal molecules 302 may be aligned almost in parallel to four diagonal directions from four corners of the pixel electrode 191 to the center of the cutout 280 of the common electrode 270, which is cross-shaped. As a result, the directors of the liquid crystal molecules 302 may be aligned accordingly in each of the first to fourth domains Da to Dd, and the liquid crystal molecules 302 may be tilted in a total of four directions across regions of a field-generating electrode.

In each of the first to fourth domains Da to Dd, the liquid crystal molecules 302 may define an average azimuth angle 310 in a similar direction to the direction in which the first, second, third, or fourth branch electrodes 194a, 194b, 194c, or 194d extend.

Accordingly, since the branch electrodes 194 extend in a total of four directions within the pixel PX, the liquid crystal molecules 302 may be tilted in a total of four directions. By varying the direction in which the liquid crystal molecules 302 are tilted, the reference viewing angle of the LCD 1 may be widened.

FIG. 3 illustrates an exemplary embodiment in which the side electrode 193 is disposed on both sides of the pixel PX (refer to FIG. 13), and FIG. 4 illustrates an exemplary embodiment in which the side electrode 193 is disposed not only on both sides of the pixel, but also at the top and the bottom sides of the pixel PX. FIG. 5 illustrates a peripheral area of the pixel PX to explain the behavior of liquid crystal molecules.

The LCD 1 may realize grayscale levels by applying voltages between the pixel electrode 191 and the common electrode 270 so as to change the behavior of the liquid crystal molecules and thus to vary the refractive index of the liquid crystal layer 300.

The LCD 1 achieves a high contrast ratio due to its excellent "dark" properties, but may result in differences in liquid crystal transmittance depending on the behavior of the liquid crystal molecules 302 and the direction from which the LCD 1 is viewed because the LCD 1 uses liquid crystal molecules 302 with negative dielectric anisotropy. That is, the LCD 1 may have weaknesses in its viewing angle because the transmittance of the LCD 1 varies from one direction to another direction.

In order to address this viewing angle issue, an electrode pattern may be disposed on both the first panel 100 and the second panel 200, as described above with reference to FIGS. 1 and 2, so as to define a multi-domain region that changes the direction of the behavior of the liquid crystal molecules 302. The electrode pattern may be the pixel electrode 191 (refer to FIG. 20) or the common electrode 270.

By defining a plurality of domains, e.g., the first to fourth domains Da to Dd, differences in the refractive index of the liquid crystal layer 300 from one viewing angle direction to another viewing angle direction may be minimized, and thus, visibility may be improved. Differences in the refractive index of the liquid crystal layer 300 from one viewing angle direction to another viewing angle direction may be minimized by using the first to fourth domains Da to Dd, but the problem of the distortion of a grayscale curve on the sides of the pixel PX may arise.

More specifically, in the multi-domain structure including the first to fourth domains Da to Dd, disclination lines may be generated on the sides of the pixel PX because some liquid crystal molecules 302 are moved in a direction corresponding to the polarization axis of the polarizing plates 140 and 240 during a "bright" or "dark" state. As a result, the optical efficiency of the LCD 1 may decrease.

To overcome the problem associated with disclination lines, the electrode patterns 191 and 270 may be varied, as described above with reference to FIGS. 1 and 2, so as to reduce the distortion of a grayscale curve in a low-grayscale period (or a "dark" state) and a high-grayscale period (or a "bright" state). Also, differences in transmittance between the high-grayscale period and the low-grayscale period may be reduced so as to minimize the distortion of a grayscale curve and thus to improve visibility and thus to improve visibility.

The behavior of liquid crystal molecules for minimizing the distortion of a gamma curve will hereinafter be described with reference to FIGS. 3 to 5, taking a domain as an example.

Referring to FIGS. 3 to 5, an electric field may be generated in the liquid crystal layer 300 between two field-generating electrodes, i.e., the pixel electrode 191 and the common electrode 270, by applying a data voltage to the pixel electrode 191 and applying a common voltage to the common electrode 270.

Fringe fields F1 to F4 may be generated in the liquid crystal layer 300 in response to an electric field being generated in the liquid crystal layer 300. A horizontal electric field in a first direction, a horizontal electric field in a second direction, a horizontal electric field in a third direction, and a horizontal electric field in a fourth direction will hereinafter be referred to as a first horizontal electric field F1, a second horizontal electric field F2, a third horizontal electric field F3, and a fourth horizontal electric field F4, respectively.

First directors 301a and second directors 301b, which are oriented in a direction from two sides of the pixel electrode 191 to the inside of the pixel PX due to the first and second horizontal electric fields F1 and F2, and third directors 301c and fourth directors 301d, which are oriented from the cutout 280 of the common electrode 270 to the inside of the pixel PX due to the third and fourth horizontal electric fields F3 and F4, may be tilted substantially in parallel to the polarization axis of the polarizing plates 140 and 240. That is, the liquid crystal molecules 302 may be tilted in a total of four directions in a single domain of the pixel PX.

More specifically, in an area along the edges of the pixel electrode 191 in the pixel PX, the first directors 301a and the second directors 301b may be perpendicular to the corresponding edges of the pixel electrode 191. In an area near the cutout 280 of the common electrode 270 in the pixel PX, the third directors 301c and the fourth directors 301d may be perpendicular to the corresponding edges of the cutout 280 of the common electrode 270.

As mentioned above, due to the fringe fields F1 to F4 generated by the edges of the pixel electrode 191 and the cutout 280 of the common electrode 270, the first directors 301a, the second directors 301b, the third directors 301c, and the fourth directors 301d may be defined.

The liquid crystal molecules 302 may be primarily aligned almost in parallel to the polarization axis of the polarizing plates 140 and 240 due to the fringe fields F1 to F4 generated by the pixel electrode 191 and the common electrode 270, thereby providing the first directors 301a, the second directors 301b, the third directors 301c, and the fourth directors 301d. The liquid crystal molecules 302 primarily aligned according to the first directors 301a, the second directors 301b, the third directors 301c, and the fourth directors 301d may be secondarily aligned so as to minimize distortion in the pixel PX. The direction in which the first directors 301a, the second directors 301b, the third directors 301c, and the fourth directors 301d are secondarily aligned may be a direction corresponding to the sum of the vectors of the directions of the first directors 301a, the second directors 301b, the third directors 301c, and the fourth directors 301d.

Accordingly, the direction in which the liquid crystal molecules 302 are secondarily aligned, i.e., the direction corresponding to the sum of the vectors of the directions of the first directors 301a, the second directors 301b, the third directors 301c, and the fourth directors 301d, may be similar to the direction in which the first, second, third, or fourth branch electrodes 194a, 194b, 194c, or 194d in the first, second, third, or third domain Da, Db, Dc, or Dd extend, and the average azimuth angle 310 may be provided in a direction similar to the direction in which the first, second, third, or fourth branch electrodes 194a, 194b, 194c, or 194d in the first, second, third, or third domain Da, Db, Dc, or Dd extend. That is, the liquid crystal molecules 302 may be aligned to have different average azimuth angles 310 in different domains of the pixel PX.

The first directors 301a, the second directors 301b, the third directors 301c, and the fourth directors 301d may be provided in the first slit patterns 195a between the first, second, third, or fourth branch electrodes 194a, 194b, 194c, or 194d.

More specifically, the sides of each of the first, second, third, or fourth branch electrodes 194a, 194b, 194c, or 194d may distort an electric field, thereby generating horizontal components that are perpendicular to the sides of each of the first, second, third, or fourth branch electrodes 194a, 194b, 194c, or 194d, and a direction in which the liquid crystal molecules 302 are to be tilted may be determined by the fringe fields F1 to F4. Accordingly, the liquid crystal molecules 302 may initially tend to be tilted in a direction perpendicular to the sides of each of the first, second, third, or fourth branch electrodes 194a, 194b, 194c, or 194d.

Since the directions of horizontal components of an electric field generated by the sides of a pair of adjacent first, second, third, or fourth branch electrodes 194a, 194b, 194c, or 194d are opposite to each other and the gap between the pair of adjacent first, second, third, or fourth branch electrodes 194a, 194b, 194c, or 194d is narrow, liquid crystal molecules 302 that tend to be tilted in opposite directions may all be tilted in a direction parallel to the longitudinal direction of the first, second, third, or fourth branch electrodes 194a, 194b, 194c, or 194d.

Accordingly, in the illustrated exemplary embodiment, the liquid crystal molecules 302 may be tilted in the longitudinal direction of the first, second, third, or fourth branch electrodes 194a, 194b, 194c, or 194d over two stages. In an alternative exemplary embodiment, the liquid crystal molecules 302 may be pretilted in the direction parallel to the longitudinal direction of the first, second, third, or fourth branch electrodes 194a, 194b, 194c, or 194d by providing protrusions on a substrate.

In the illustrated exemplary embodiment, the first slit patterns 195a may be defined in the pixel PX, and as a result, the liquid crystal molecules 302 may be tilted in the directions of the first directors 301a, the second directors 301b, the third directors 301c, and the fourth directors 301d due to the fringe fields F1 to F4. Accordingly, the response speed of the LCD 1 may be improved.

Due to the aforementioned behavior of the liquid crystal molecules 302, different average azimuth angles 310 may be provided in different domains of the pixel PX. Referring back to FIGS. 1 and 2, in the first domain Da of the pixel PX, the directors of the liquid crystal molecules 302 may be diagonally aligned in an upper right direction relative to the horizontal cutout portion 283, thereby defining an average azimuth angle 310 corresponding to the direction a.

In the second domain Db of the pixel PX, the directors of the liquid crystal molecules 302 may be diagonally aligned in an upper left direction relative to the horizontal cutout portion 283, thereby defining an average azimuth angle 310 corresponding to the direction b.

In the third domain Dc of the pixel PX, the directors of the liquid crystal molecules 302 may be diagonally aligned in a lower left direction relative to the horizontal cutout portion 283, thereby defining an average azimuth angle 310 corresponding to the direction c.

In the fourth domain Dd of the pixel PX, the directors of the liquid crystal molecules 302 may be diagonally aligned in a lower right direction relative to the horizontal cutout portion 283, thereby defining an average azimuth angle 310 corresponding to the direction d.

Accordingly, the liquid crystal molecules 302 may be controlled to be aligned in different directions in different domains of the pixel PX along the longitudinal directions of the branch electrodes 194, and thus, the side visibility of the LCD 1 may be improved.

In an area where the cutout 280 is defined, the intensity of the fringe fields F1 to F4, which are applied to the pixel electrode 191, may be adjusted by adjusting the width of the cutout 280. In the area where the cutout 280 is defined, the fringe fields F1 to F4 may not be generated.

Referring back to FIG. 3, in one of the first to fourth domains Da to Dd, for example, in the first domain Da, an area where the central electrode 192 and parts of the fine branches 194 adjacent to the central electrode 192 are located may be defined as a first area X. In the first area X, the liquid crystal molecules 302 may be aligned mostly in a direction of the average azimuth angle 310 along the direction in which the first branch electrodes 194a extend, due to the force of the fringe fields F1 to F4 and collisions between the liquid crystal molecules 302.

An area which is apart from the central electrode 192 and in which a side (e.g., a top side) of the pixel electrode 191 that is parallel to the horizontal cutout portion 283 is located may be defined as a second area Y, and an area where a side (e.g., a right side) of the pixel electrode 191 that is parallel to the vertical cutout portion 286 is located may be defined as a third area Z. In FIG. 3, an area where a side electrode 193 and a second slit pattern 195b of the pixel electrode 191 are provided may be defined as the third area Z, and an area where the side electrode 193 and the second slit pattern 195b of the pixel electrode 191 are not provided may be defined as the second area Y.

In the second area Y, only the force of the first horizontal electric field F1, which is generated along an edge of the pixel PX, may exist. That is, in the second area Y, liquid crystal molecules 302 having the first directors 301a may exist. Since the second area Y is relatively distant from the horizontal cutout portion 283, the force of the third horizontal electric field F3 may not reach the second area Y. Accordingly, since in the second area Y, a vector for secondarily moving the liquid crystal molecules 302 having the first directors 301a, i.e., the third directors 301c provided by the force of the third horizontal electric field F3, rarely exist, the liquid crystal molecules 302 may be tilted in parallel to the vertical cutout portion 286.

Thus, the first directors 301a, which are substantially parallel to the polarization axis of the polarizing plates 140 and 240, among other liquid crystal molecules 302 moved by the fringe fields F1 to F4, may be disposed in the second area Y.

In an exemplary embodiment, the LCD 1 may achieve maximum transmittance only when the average azimuth angle 310 and the polarization axis of the polarizing plates 140 and 240 have an angle of about 45° therebetween in response to voltages being applied to the first and second panels 100 and 200, for example.

However, since the horizontal and vertical edges of the pixel electrodes 191 and the horizontal and vertical cutouts 283 and 286 may be aligned with the polarization axis of the polarizing plates 140 and 240, the transmittance of the LCD 1 may decrease in the second area Y because of the liquid crystal molecules 302 tilted in a similar direction to the direction of the polarization axis of the polarizing plates 140 and 240. That is, in the second area Y, the angle between the average azimuth angle 310 and the polarization axis of the polarizing plates 140 and 240 may be less than about 45°, and as a result, the transmittance of the LCD 1 may decrease.

In the third area Z, since the second slit pattern 195b is disposed between the side electrode 193 and some of the first branch electrodes 194a, a fringe field may be further generated in the side electrode 193 and the ends of the first branch electrodes 194a. Thus, in an area where the second slit pattern 195b is defined, the liquid crystal molecules 302 collide with one another due to the fringe field. Accordingly, in the third area Z, the liquid crystal molecules 302 may be aligned in a similar direction to the direction of the average azimuth angle 310.

More specifically, in a part of the third area Z where the connecting electrode 199 is provided, horizontal electric field components having the direction of the third directors 301c, which are disposed in the side electrode 193, and horizontal electric field components having the direction of the second directors 301b, which are disposed at the lower ends of the first branch electrodes 194a, may move the liquid crystal molecules 302.

In part of the third area Z that is adjacent to the cutout 280, the vectors of the second horizontal electric field F2 and the third horizontal electric field F3, which move the liquid crystal molecules 302 in the directions of the third directors 301c and the second directors 301b, may move the liquid crystal molecules 302 from an acute angle to an obtuse angle, thereby lowering the transmittance of the LCD 1.

To address this problem, the LCD 1 may include the second slit pattern 195b in the pixel PX.

Referring to FIG. 5, a fringe field may be generated in the second slit pattern 195b, i.e., between the side electrode 193 and the ends of the first, second, third, or fourth branch electrodes 194a, 194b, 194c, or 194d. As a result, a sixth horizontal electric field F6 may be generated in a direction to the ends of the first, second, third, or fourth branch electrodes 194a, 194b, 194c, or 194d, and a fifth horizontal electric field F5 may be generated in a direction to the side electrode 193.

In the third area Z where the side electrode 193 is provided, not only the fifth horizontal electric field F5, which is generated by a side of the pixel electrode 191, but also the third horizontal electric field F3, which is generated by a side of the cutout 280 near the pixel electrode 191, may serve as main horizontal electric fields.

In an area near the vertical cutout portion 286, the fourth horizontal electric field F4 may be generated. Since the fourth horizontal electric field F4 is relatively distant from the third area Z, the third area Z may not be much influenced by the fourth horizontal electric field F4. The fifth horizontal electric field F5 may be generated by a left side of the side electrode 193, and may be in an opposite direction to a direction from outside toward a side of the pixel electrode 191, i.e., the second horizontal electric field F2.

There may exist a vector for secondarily aligning the liquid crystal molecules 302 due to the collisions between "3-1" directors 301c' and the fourth directors 301d, which are moved by the fifth horizontal electric field F5 and the third horizontal electric field F3. Accordingly, in the third area Z, liquid crystal molecules 302 moved with the "3-1" directors 301c' and the third directors 301c may collide with one another and may thus be aligned to have a similar azimuth angle to the average azimuth angle 310. The intensity of the fifth horizontal electric field F5 along the edges of the pixel PX may vary depending on the distance to the cutout 280 and the width of the second slit pattern 195b. In an exemplary embodiment, the width of the cutout 280 may be about 2 μm to about 5 μm.

In the third area Z on a side of the pixel PX, a fringe field capable of secondarily aligning the liquid crystal molecules 302 may be generated, and the liquid crystal molecules 302 may be aligned substantially in an average alignment direction of the first domain Da, i.e., in the direction of the average azimuth angle 310 of the first domain Da. Accordingly, any decrease in the transmittance of the LCD 1 that may be caused by irregular alignment of the liquid crystal molecules 302 along the sides of the pixel PX may be reduced.

In the illustrated exemplary embodiment, since the second slit pattern 195b may be disposed on a side of the first domain Da, the liquid crystal molecules 302 aligned in a similar direction to the direction of the polarization axis of the polarizing plates 140 and 240 may be adjusted to have the average azimuth angle 310. Accordingly, the transmittance and the side viewing angle in the third area Z may be improved. In the illustrated exemplary embodiment, the second slit pattern 195b may be disposed only on both lateral sides of the pixel PX to improve the side viewing angle of the LCD 1.

Accordingly, by defining the second slit pattern 195b in the pixel electrode 191, the liquid crystal molecules 302 moved in the direction of the polarization axis of the polarizing plates 140 and 240 may be minimized, and as a result, the transmittance of the LCD 1 may be improved.

As illustrated in FIG. 4, in the first area X, the liquid crystal molecules 302 may be moved by the influence of fringe fields, and may collide with one another in the directions where they are moved. The liquid crystal molecules 302 may be moved in a direction parallel to the direction in which the first branch electrodes 194a extend. In an exemplary embodiment, the liquid crystal molecules 302 and the first branch electrodes 194a may be tilted about 45° with reference to the horizontal cutouts 283.

The second slit pattern 195b may be disposed in both the second and third areas Y and Z, thereby generating a fringe field between the side electrode 193 and the ends of the first branch electrodes 194a.

That is, in the second and third areas X and Y, the liquid crystal molecules 302 may collide with one another due to a fringe field, and may thus be aligned in a similar direction to the direction of the average azimuth angle 310. The second slit pattern 195b may be disposed in the second and third areas Y and Z where the liquid crystal molecules 302 are not properly controlled and are thus aligned to have a similar azimuth angle to the polarization axis of the polarizing plates 140 and 240.

The azimuth angle of the liquid crystal molecules 302 may be determined by the sum of a vector provided by an electric field and a vector provided by collisions between the liquid crystal molecules 302. In order to generate force for moving the liquid crystal molecules 302, the pixel electrode 191 and the common electrode 270 may be patterned in the pixel PX so as to control the azimuth angle of the liquid crystal molecules 302.

The pixel electrode 191 and the common electrode 270 may be patterned in the pixel PX so as to generate an electric field in the liquid crystal layer 300 and thus to control the azimuth angle of the liquid crystal molecules 302. As a result, liquid crystal molecules 302 having similar the average azimuth angle of an average alignment direction 310 may be obtained. Accordingly, the viewing angle of the LCD 1 may be improved.

Thus, a vector for secondarily aligning the liquid crystal molecules 302 along the sides of the pixel electrode 191 may be generated, and as a result, the liquid crystal molecules 302 near the edges of the pixel electrode 191 may be prevented from being tilted in a direction perpendicular to the sides of the pixel electrode 191. That is, the degradation of the display quality of the LCD 1 that may be caused due to the liquid crystal molecules 302 near the edges of the pixel electrode 191, i.e., the liquid crystal molecules 302 in the second or third area Y or Z, being aligned in parallel to the polarization axis of the polarizing plates 140 and 240 may be prevented.

In conclusion, by defining the second slit pattern 195b in the pixel electrode 191, the liquid crystal molecules 302 moved in the direction of the polarization axis of the polarizing plates 140 and 240 may be minimized, and as a result, the transmittance of the LCD 1 may be improved.

Figure 6:
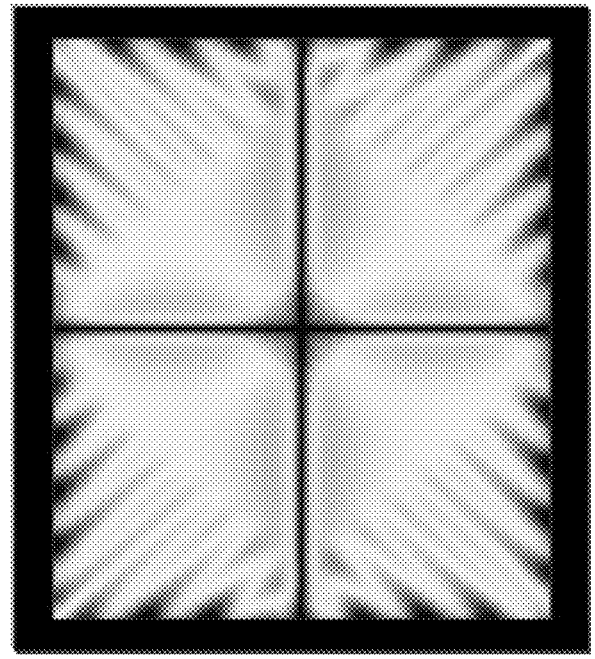
FIGS. 6 to 8 are images captured from the planes of exemplary embodiments of pixels of LCDs according to the invention and the plane of a pixel of an LCD according to a comparative example.
Figure 7:
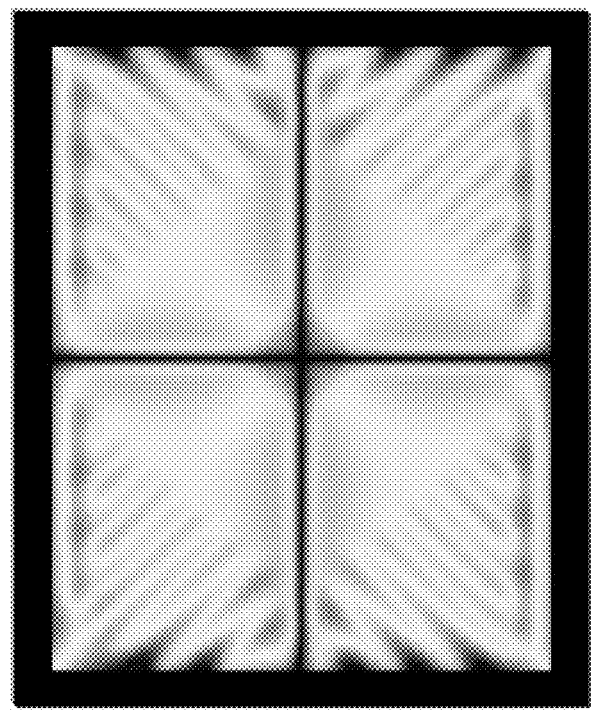
Figure 8:
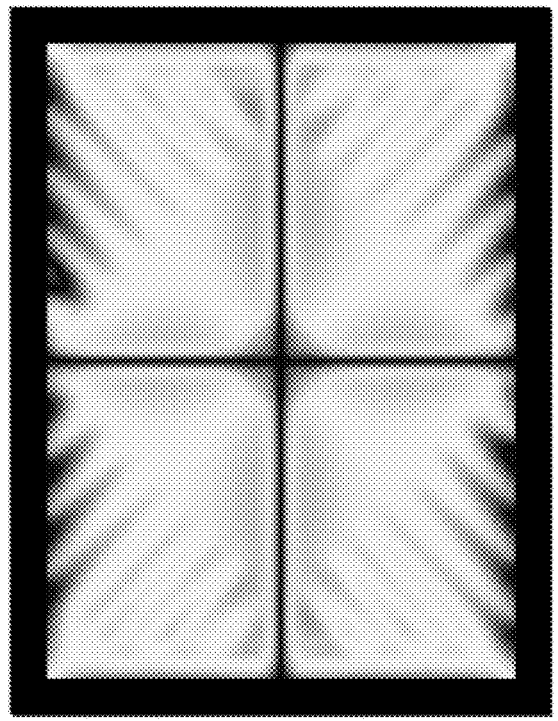
Figure 9:
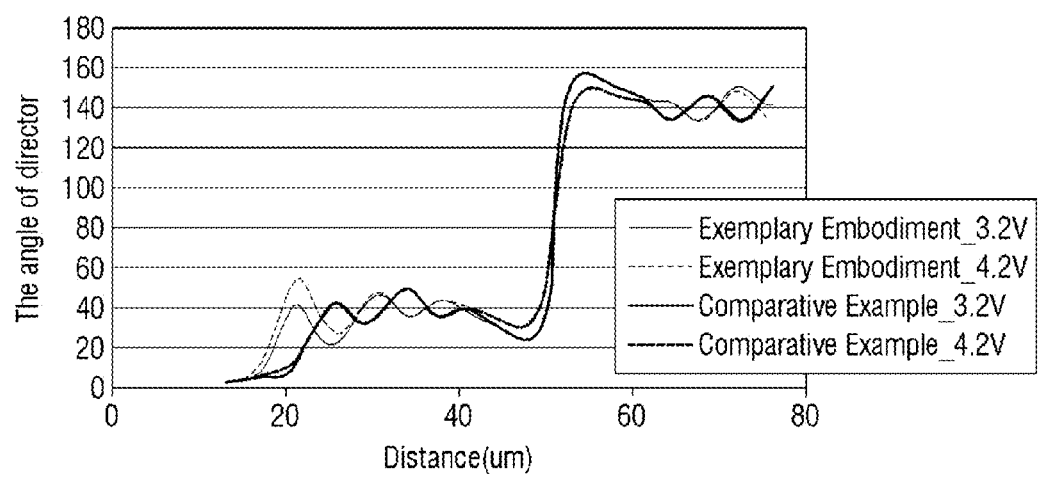
FIG. 9 is a graph showing an exemplary embodiment of the distribution of the azimuth angles of liquid crystal molecules in a pixel of an LCD according to the invention and in a pixel of an LCD according to a comparative example.
Figure 10:
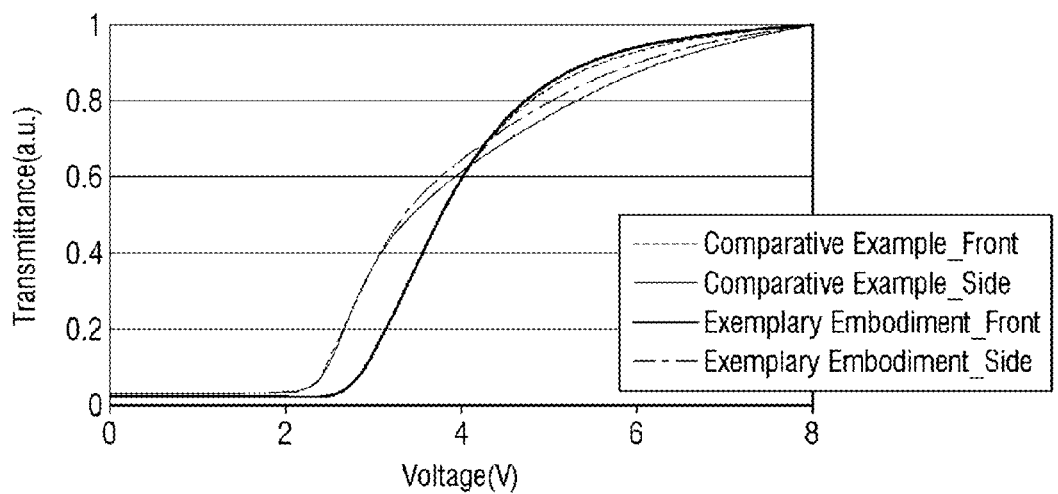
FIG. 10 is a graph showing an exemplary embodiment of the variation of the transmittance of a pixel with a voltage in an LCD according to the invention.
Figure 11:
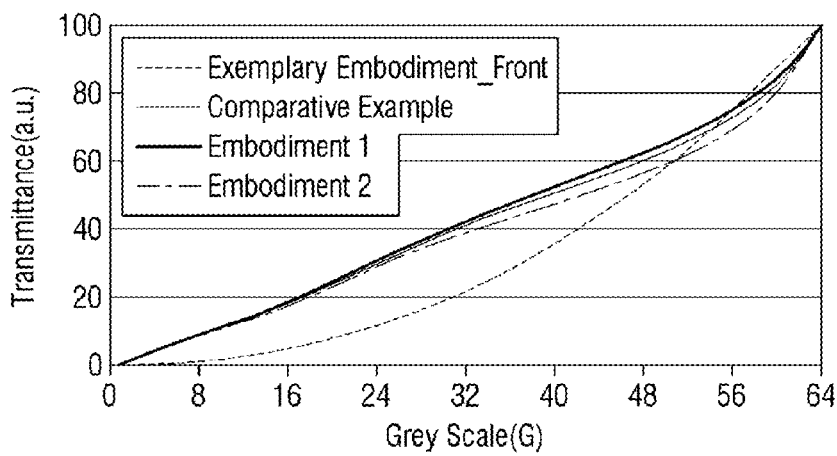
FIG. 11 is a graph showing an exemplary embodiment of the variation of the transmittance of a pixel with grayscale in an LCD according to the invention.
Figure 12:
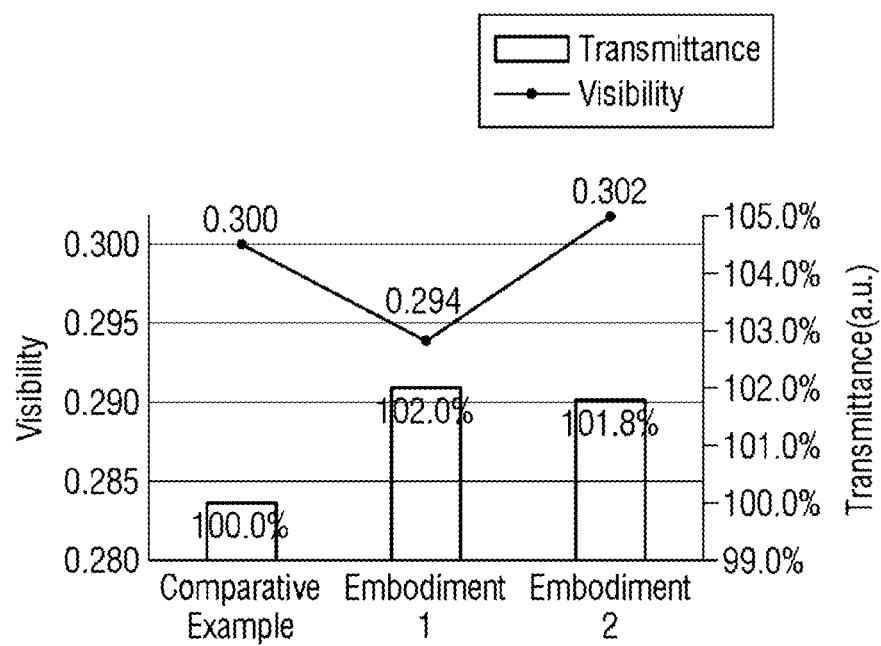
FIG. 12 is a graph showing an exemplary embodiment of the transmittance and visibility of an LCD according to the invention.

FIGS. 6 to 8 are images captured from the planes of pixels of LCDs according to exemplary embodiments of the invention and the plane of a pixel of an LCD according to a comparative example, FIG. 9 is a graph showing the distribution of the azimuth angles of liquid crystal molecules in a pixel of an LCD according to an exemplary embodiment of the invention and in a pixel of an LCD according to a comparative example, FIG. 10 is a graph showing the variation of the transmittance of a pixel with a voltage in an LCD according to an exemplary embodiment of the invention, FIG. 11 is a graph showing the variation of the transmittance of a pixel with grayscale in an LCD according to an exemplary embodiment of the invention, and FIG. 12 is a graph showing the transmittance and visibility of an LCD according to an exemplary embodiment of the invention.

In the description that follows, FIGS. 1 to 5 will be referred to again for convenience.

FIG. 6 shows an image captured from a pixel of a related-art LCD, and FIGS. 7 and 8 show images captured from pixels of LCDs according to embodiments 1 and 2 of the invention. More specifically, FIG. 7 shows an image captured from a pixel PX with a second slit pattern 195*b* disposed on both sides thereof, and FIG. 8 shows an image captured from a pixel PX with a second slit pattern 195*b* disposed at the top and bottom sides thereof. FIG. 9 shows the distribution of the azimuth angles of liquid crystal molecules in a plane along line II-II' of FIG. 1.

Referring to FIGS. 6 to 9, an LCD 1 includes second slit patterns 195*b*, which separate side electrodes 193 and branch electrodes 194 from each other and are disposed in parallel to the side electrodes 193. The following description will be presented, taking the third area Z as an example.

When liquid crystal molecules 302 having first directors 301*a*, second directors 301*b*, third directors 301*c*, and fourth directors 301*d* that are moved by fringe fields are aligned in parallel to the polarization axis of polarizing plates 140 and 240, the transmittance of the LCD 1 may be lowered. The liquid crystal molecules 302 disposed on the second slit patterns 195*b* may be adjusted by the second slit patterns 195*b* to have an average azimuth angle 310.

In the related-art LCD of FIG. 6, no second slit patterns 195*b* are provided on the sides of the pixel PX. Thus, the force of the fourth horizontal electric field F4 may be relatively apart from the third area and thus may not sufficiently reach the third area Z, and as a result, the third horizontal electric field F3 and the second horizontal electric field F2 may serve as main electric fields. Accordingly, in the related-art LCD, the liquid crystal molecules 302 may be aligned to have a different azimuth angle from the average azimuth angle 310 due to the sum of the vectors of the third horizontal electric field F3 and the second horizontal electric field F2.

Due to the third horizontal electric field F3 and the second horizontal electric field F2, the liquid crystal molecules 302 in the third area Z may be aligned in a direction similar to the polarization axis of the polarizing plates 140 and 240, and as a result, the transmittance of the related-art LCD may decrease.

In the LCDs of FIGS. 7 and 8, the fifth horizontal electric field F5 may be provided due to the second slit pattern 195*b*, and due to the fifth horizontal electric field F5, the liquid crystal molecules 302 in the third area Z may be aligned to have a similar azimuth angle to the average azimuth angle 310. Accordingly, the transmittance of the LCDs of FIGS. 7 and 8 may be improved in the second area Y or the third area Z, i.e., on the sides of the pixel PX or at the top and the bottom sides of the pixel PX.

As illustrated in FIG. 9, when a low voltage is applied to the pixel electrode 191 to realize a low grayscale level in the pixel PX, the liquid crystal molecules 302 are aligned to have an azimuth angle of about 40°, and when a high grayscale level is realized, the liquid crystal molecules 302 are aligned to have an azimuth angle of about 60°. FIG. 9 shows azimuth angle measurements obtained from the liquid crystal molecules 302 along the plane along line II-II' of FIG. 1 by applying a voltage of about 3.2 volts (V) and a voltage of about 4.2 V to the pixel electrode 191 to realize a low grayscale level and a high grayscale level, respectively.

Due to the second slit pattern 195*b*, horizontal electric field components may be generated in the edges of the pixel PX, i.e., the second area Y or the third area Z, and thus, the liquid crystal molecules 302 may be adjusted to have the average azimuth angle 310.

Referring to FIG. 10, at a high grayscale level, the LCD 1 has a similar front transmittance to the related-art LCD and a higher lateral transmittance than the related-art LCD, which is believed to be due to the presence of the second slit pattern 195*b*.

At an intermediate or high grayscale level for which a voltage of about 4.2 V is applied, the difference between the front transmittance and the lateral transmittance of the LCD 1 may be reduced. Accordingly, an improvement in the visibility of the LCD 1 at an intermediate or high grayscale level may be expected.

FIG. 11 illustrates the variation of lateral transmittance with grayscale in each of the pixels of FIGS. 6 to 8. Referring to FIG. 11, embodiment 1 corresponds to a pixel PX with a second slit pattern 195*b* disposed on both sides thereof, i.e., the pixel PX of FIG. 7, and embodiment 2 corresponds to a pixel with a second slit pattern 195*b* disposed at the top and bottom sides thereof, i.e., the pixel PX of FIG. 8.

As illustrated in FIG. 11, a pixel PX with a second silt pattern 195*b* disposed on both sides thereof, i.e., the pixel PX according to embodiment 1, has a slightly higher transmittance than the pixel of the related-art LCD. The pixel PX according to embodiment 1 has an increased difference between the lateral transmittance and the front transmittance thereof, and has a visibility of about 0.294.

A pixel PX with a second slit pattern 195*b* at the top and bottom sides thereof, i.e., the pixel PX according to embodiment 2, has a lower transmittance than the pixel of the related-art LCD. The pixel PX according to embodiment 1 has a reduced difference between the lateral transmittance and the front transmittance thereof, and has a visibility of about 0.302.

In the exemplary embodiment of FIG. 1 and other exemplary embodiments, the difference between the front transmittance and the lateral transmittance of the LCD 1 may be reduced, and as a result, the side visibility of the LCD 1 may be improved. The improvement of the visibility of the LCD 1 may be apparent when the second slit pattern 195*b* is disposed on both sides of the pixel PX.

Accordingly, the results of the measurement of lateral transmittance at different grayscale levels show that the LCD 1 exhibits an improvement of up to 0.006 in visibility, compared to the related-art LCD.

FIG. 12 shows transmittance and visibility measurements obtained from a pixel PX with a second slit pattern 195*b* disposed on both sides thereof, i.e., the pixel PX according to embodiment 1 and a pixel PX with a second slit pattern 195*b* disposed at the top and bottom sides thereof, i.e., the pixel PX according to embodiment 2, assuming that the transmittance of a pixel of the related-art LCD is 100%

Referring to FIG. 12, the pixel of the related-art LCD has a transmittance of 100% and a visibility of about 0.300, whereas the pixel PX according to embodiment 2 has a transmittance of about 101.8% and a visibility of about 0.302. That is, the pixel PX according to embodiment 2 has an increase of about 1.8% in transmittance and an increase of 0.002 in visibility, compared to the pixel of the related-art LCD. That is, the visibility of the pixel PX according to embodiment 2 is improved, compared to the pixel of the related-art LCD.

The pixel PX according to embodiment 1 has a transmittance of 102.0% and a visibility of about 0.294. That is, the pixel PX according to embodiment 1 has an increase of about 2% in transmittance and a decrease of 0.006 in visibility, compared to the pixel of the related-art LCD. That is, the visibility of the pixel PX according to embodiment 1 is generally improved, compared to the pixel of the related-art LCD.

FIGS. 13 to 18 are plan views of pixels of LCDs according to exemplary embodiments of the invention. In FIGS. 1 to 5 and 13 to 18, like reference numerals indicate like elements, and thus, descriptions thereof will be omitted or at least simplified.

A pixel electrode 191 of an LCD 1 according to another exemplary embodiment of the invention will hereinafter be described. The pixel electrode 191 may include a central pattern 192, which is disposed in a central part of a pixel PX, and fine branches 194, which extend from the sides of the central part 192. The fine branches 194 may include a plurality of branch electrodes, i.e., first branch electrodes 194a, second branch electrodes 194b, third branch electrodes 194c, and fourth branch electrodes 194d, and first slit patterns 195a, which correspond to gaps between the first branch electrodes 194a, between the second branch electrodes 194b, between the third branch electrodes 194c, and between the fourth branch electrodes 194d that expose therethrough an insulating layer including a protective layer, may be provided in the pixel PX.

The pixel electrode 191 of the pixel PX may also include side electrodes 193, which are disposed on both sides of the pixel electrode 191. The central pattern 192, the branch electrodes 194, and the side electrodes 193 of the pixel electrode 191 are connected to one another.

Second slit patterns 195-1b, which separate the ends of some of the branch electrodes 194 from the side electrodes 193 and extend in parallel to the longitudinal direction of the side electrodes 193, may also be provided in the pixel PX.

Figure 13:
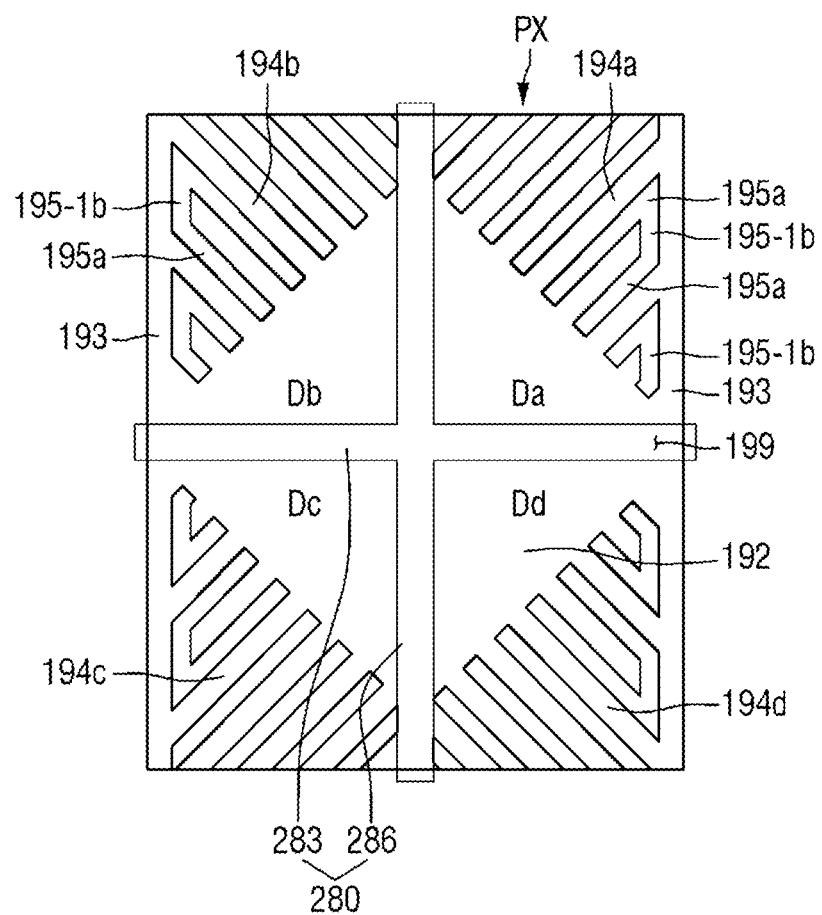
FIGS. 13 to 18 are plan views of to exemplary embodiments of pixels of LCDs according the invention.
Figure 14:
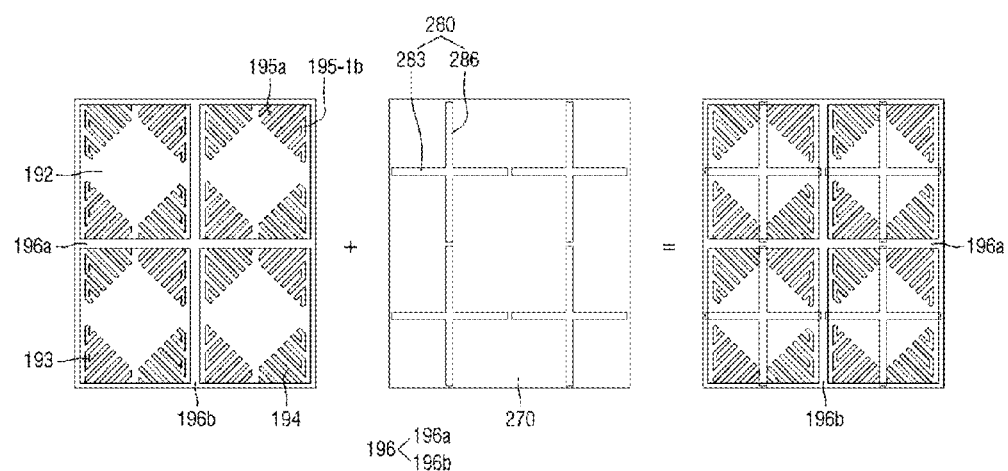

More specifically, referring to FIGS. 13 and 14, second slit patterns 195-1b, which are disposed along the longitudinal direction of the side electrodes 193 and are dot-shaped, may be provided. The second slit patterns 195-1b may be provided on both sides of the pixel electrode 191, as illustrated in FIGS. 13 and 14, or may be provided at the top and the bottom sides of the pixel electrode 191.

The second slit patterns 195-1b may connect the ends of some of the first slit patterns 195a. When the second slit patterns 195-1b are provided at the ends of all the branch electrodes 194, the pixel electrode 191 may have the same shape as that illustrated in FIG. 1. Instead, in the illustrated exemplary embodiment, a dot-shaped second slit pattern 195-1b may be provided between every other pair of first slit patterns 195a. That is, the dot-shaped second silt pattern 195-1b may be provided at the ends of every other pair of first slit patterns 195a in a "stepping stone" manner. The branch electrodes 194 and the side electrodes 193 may be connected to each other in areas where the second slit patterns 195b-1 are not provided.

According to the illustrated exemplary embodiment, a vector for secondarily aligning liquid crystal molecules 302 near the edges of the pixel electrode 191 may be generated, thereby adjusting the tilt of the liquid crystal molecules 302 in directions perpendicular to the edges of the pixel electrodes 191. That is, the degradation of the display quality of the LCD 1 that may be caused due to the liquid crystal molecules 302 in a third area Z (refer to FIG. 3) on a side of the pixel PX being aligned in parallel to the polarization axis of polarizing plates 140 and 240 may be prevented.

By arranging the second slit patterns 195b on the sides of the pixel PX, the side visibility of the LCD may be improved.

As illustrated in FIG. 14, the second slit patterns 195-1b may be arranged in an alternate manner in a pair of adjacent pixels PX.

Gap portions 196 may be disposed among a plurality of pixels PX. The gap portions 196 may include horizontal gap portions 196a, which horizontally separate the plurality of pixels PX from one another, and vertical gap portions 196b, which vertically separate the plurality of pixels PX from one another. In the gap portions 196, an insulating layer that exposes a protective layer separating the plurality of pixels PX from one another may be disposed. In areas where the gap portions 196 are provided, thin-film transistor ("TFT") conductive lines, which control the plurality of pixels PX, may be disposed, and protrusions, which provide the liquid crystal molecules 302 with a pretilt angle, may also be disposed.

Due to horizontal electric field components generated by the second slit patterns 195-1b, which are dot-shaped and may be provided along the boundaries between the plurality of pixels PX, the number of liquid crystal molecules 302 aligned in a 45° direction that maximizes transmittance and having an average azimuth angle 310 may be increased.

Figure 15:
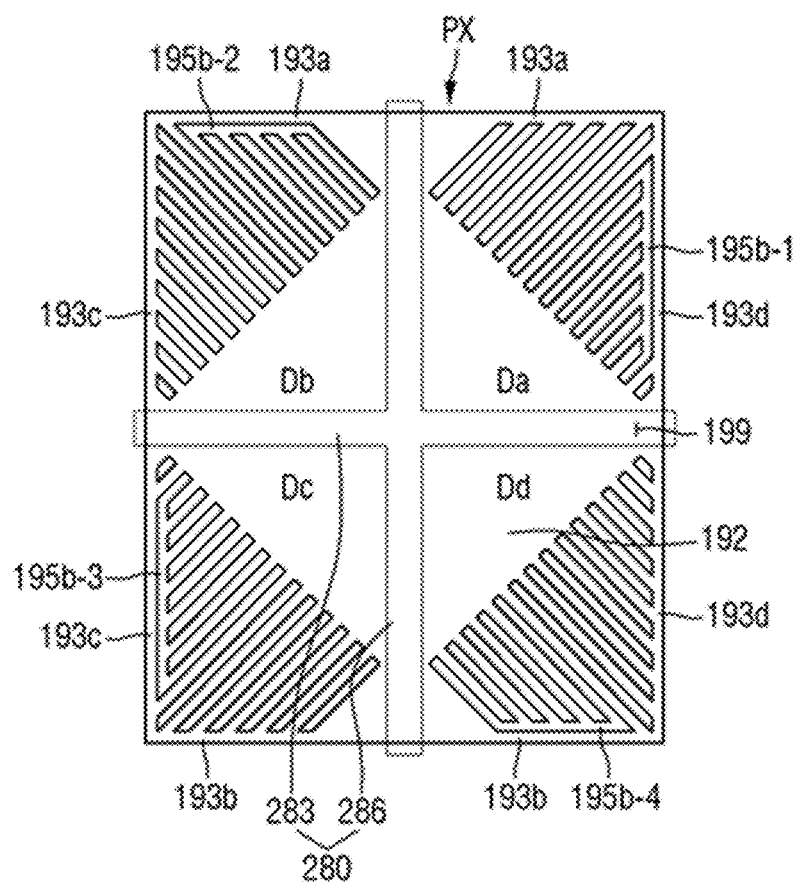
Figure 16:
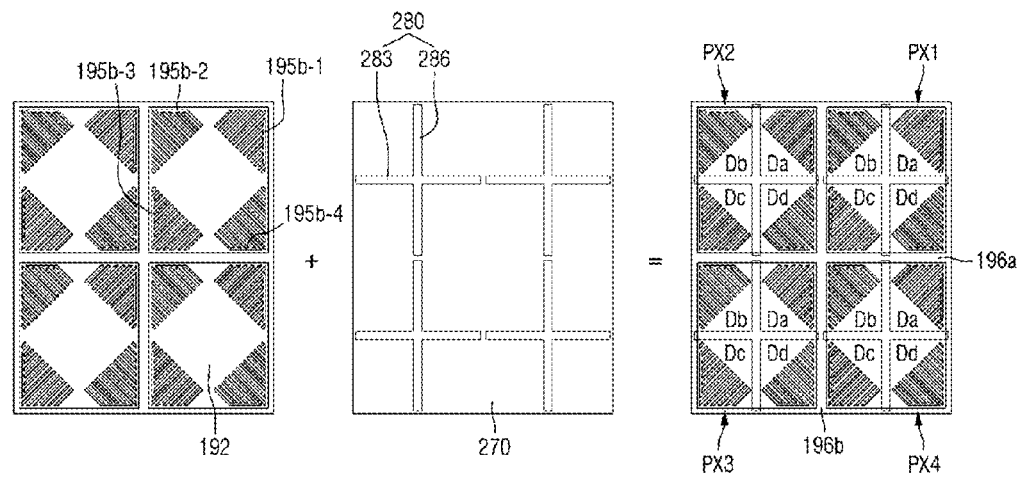

Referring to FIGS. 15 and 16, two second slit patterns 195b, which are bar-shaped, may be disposed on both sides of a pixel PX. In the illustrated exemplary embodiment, side electrodes 193 may be disposed along all the edges of the pixel PX, i.e., at the top and bottom sides and on the left and right sides of the pixel PX.

For a proper distinction, the side electrodes 193 may be divided into first to fourth side electrodes 193a to 193d, which are disposed at the top side, the bottom side, on the left side, and on the right side, respectively, of the pixel PX. More specifically, the side electrode 193 at the top of the pixel PX may be defined as the first side electrode 193a, the side electrode 193 at the bottom of the pixel PX may be defined as the second side electrode 193b, the side electrode 193 on the left side of the pixel PX may be defined as the third side electrode 193c, and the side electrode 193 on the right side of the pixel PX may be defined as the fourth side electrode 193d.

In the illustrated exemplary embodiment, a "2-1" slit pattern 195b-1 may be disposed near the fourth side electrode 193d, which is provided in a first domain Da of the pixel PX, to extend in parallel to the fourth side electrode 193d. The "2-1" slit pattern 195b-1 may be disposed on the right side of the first domain Da. That is, the "2-1" slit pattern 195b-1 may be provided near the fourth side electrode 193d as a bar extending in parallel to the longitudinal direction of the fourth side electrode 193d.

A "2-2" slit pattern 195b-2 may be disposed near the first side electrode 193a, which is provided in a second domain Db of the pixel PX, to extend in parallel to the first side electrode 193a. The "2-2" slit pattern 195b-2 may be disposed at the left top side of the second domain Db. That is, the "2-2" slit pattern 195b-2 may be provided near the first side electrode 193a as a bar extending in parallel to the longitudinal direction of the first side electrode 193a.

A "2-3" slit pattern 195b-3 may be disposed near the third side electrode 193c, which is provided in a third domain Dc of the pixel PX, to extend in parallel to the third side electrode 193c. The "2-3" slit pattern 195b-3 may be disposed on the left side of the third domain Dc. That is, the "2-3" slit pattern 195b-3 may be provided near the third side electrode 193c as a bar extending in parallel to the longitudinal direction of the third side electrode 193c.

A "2-4" slit pattern 195b-4 may be disposed near the second side electrode 193b, which is provided in a fourth domain Dd of the pixel PX, to extend in parallel to the second side electrode 193b. The "2-4" slit pattern 195b-4 may be disposed at the right bottom of the fourth domain Dd. That is, the "2-4" slit pattern 195b-4 may be provided near the second side electrode 193b as a bar extending in parallel to the longitudinal direction of the second side electrode 193b.

As illustrated in FIGS. 15 and 16, in response to a plurality of pixels PX being provided, a third side electrode 193c of one of the plurality of pixels PX and a fourth side electrode 193d of another one of the plurality of pixels PX may be disposed adjacent to each other. For convenience, it is assumed that there are four pixels PX provided, and that the upper right pixel PX, the upper left pixel PX, the lower left pixel PX, and the lower right pixel PX are defined as a first pixel PX1, a second pixel PX2, a third pixel PX3, and a fourth pixel PX4, respectively. The first to fourth pixels PX1 to PX4 may be separated from one another by a predetermined distance due to the presence of a vertical gap portion 196b and a horizontal gap portion 196a.

A third domain Dc of the first pixel PX1 may be disposed adjacent to a fourth domain Dd of the second pixel PX2 in a horizontal direction. A second domain Db of the first pixel PX1 may be disposed adjacent to a first domain Da of the second pixel PX2 in a vertical direction. A "2-3" silt pattern 195b-3 in the third domain Dc of the first pixel PX1 may be in an alternate arrangement with a "2-4" slit pattern 195b-4 in the fourth domain Dd of the second pixel PX2.

Accordingly, the "2-3" silt pattern 195b-3 in the third domain Dc of the first pixel PX1 may generate horizontal electric field components in a border area with the fourth domain Dd of the second pixel PX2, and a "2-1" slit pattern 195b-1 in the first domain Da of the second pixel PX2 may generate horizontal electric field components in a border area with the second domain Db of the first pixel PX1. Therefore, by using second slit patterns 195b disposed between a pair of adjacent pixels PX, liquid crystal molecules 302 disposed along the border between the pair of adjacent pixels PX may be adjusted to have an average azimuth angle 10.

According to the illustrated exemplary embodiment, by arranging second silt patterns 195b in an alternate manner in each pair of adjacent pixels PX, the behavior of liquid crystal molecules 302 may be appropriately adjusted such that the liquid crystal molecules 302 are oriented to a direction of the average azimuth angle 310. As a result, the visibility of an LCD 1 may be improved.

Figure 17:
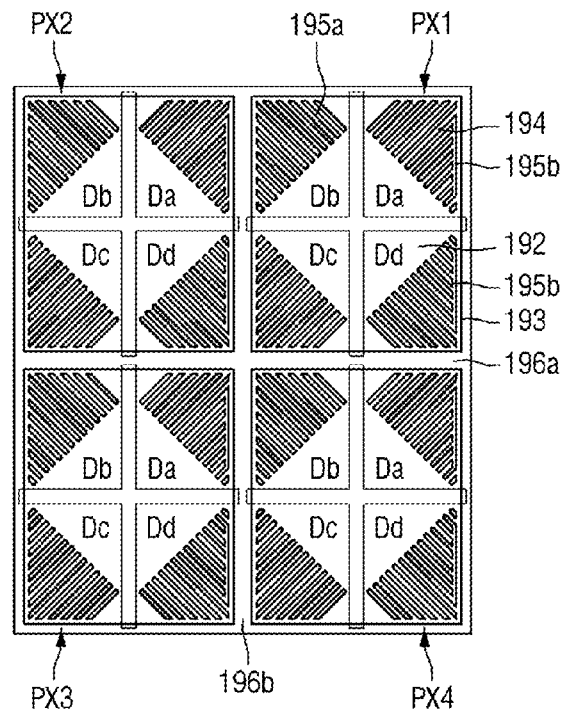

Referring to FIG. 17, second slit patterns 195b may be disposed in each of a plurality of pixels PX. The second slit patterns 195b may be disposed on one side of each of the plurality of pixels PX so as to adjust the azimuth angle of liquid crystal molecules 302 with the use of a fringe field between each pair of adjacent pixels PX.

More specifically, the second slit patterns 195b may be disposed on one side of each of the plurality of pixels PX. That is, the second slit patterns 195b may be disposed on the sides of first and fourth domains Da and Dd of each of the plurality of pixels PX so as to generate horizontal electric field components in the respective neighboring pixels PX and thus to move the liquid crystal molecules 302 to have an average azimuth angle 310. That is, liquid crystal molecules 302 in a border area between the first domain Da of a second pixel PX2 and the second domain Db of a first pixel PX1 may be moved to a direction of the average azimuth angle 310. Also, liquid crystal molecules 302 in a border area between the fourth domain Dd of the second pixel PX2 and the third domain Dc of the first pixel PX1 may be moved to the direction of the average azimuth angle 310. In an alternative exemplary embodiment, the second slit patterns 195b may be provided on the sides of second domain Db and the third domain Dc of each of the plurality of pixels PX, thereby obtaining the same effect as that obtained by providing the second slit patterns 195b on the sides of the first and fourth domains Da and Dd of each of the plurality of pixels PX.

According to the exemplary embodiment, by arranging the second slit patterns 195b in an alternate manner between each pair of adjacent pixels PX, the behavior of liquid crystal molecules 302 may be appropriately adjusted such that the liquid crystal molecules 302 are oriented to the direction of the average azimuth angle 310. As a result, the visibility of an LCD 1 may be improved.

Figure 18:
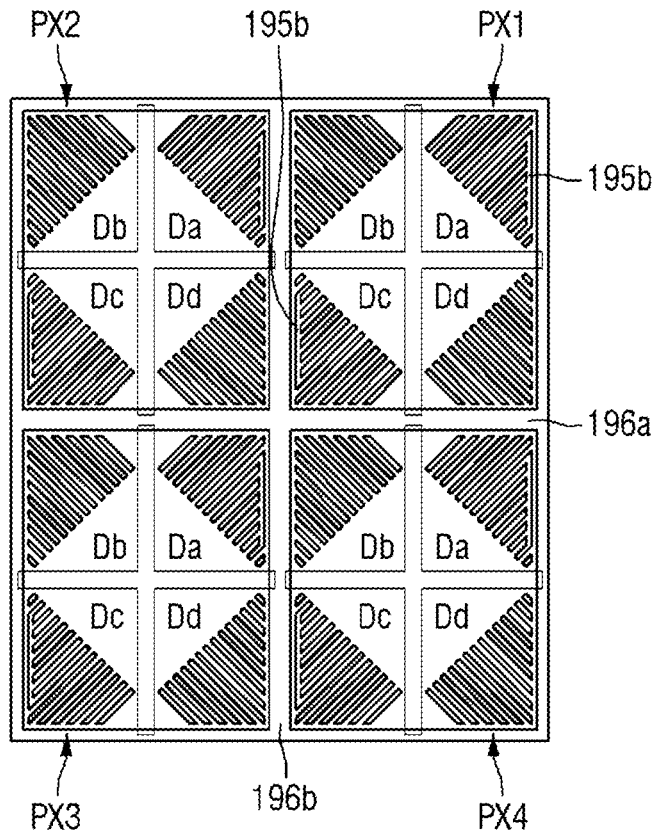

Referring to FIG. 18, two second slit patterns 195b may be disposed on both sides of each of a plurality of pixels PX. More specifically, a second slit pattern 195b may be disposed at the lower bottom of a first pixel PX1, i.e., in a third domain Dc of the first pixel PX1, and another second silt pattern 195b may be disposed in a first domain Da of the first pixel PX1.

Accordingly, the third domain Dc of the first pixel PX1 may be affected by a second slit pattern 195b in a first domain Da of a second pixel PX2, and as a result, the movement of liquid crystal molecules 302 in an edge area of the third domain Dc of the first pixel PX1 may be facilitated.

The first domain Da of the second pixel PX2 may also be affected by a second slit pattern 195b in the third domain Dc of the first pixel PX1, and as a result, the movement of liquid crystal molecules 302 in an edge area of the first domain Da of the second pixel PX2 may be facilitated.

According to the illustrated exemplary embodiment, by arranging the second slit patterns 195b in an alternate manner in each pair of adjacent pixels PX, the behavior of liquid crystal molecules 302 may be appropriately adjusted such that the liquid crystal molecules 302 are oriented to a direction of an average azimuth angle 310. As a result, the visibility of an LCD 1 may be improved.

Figure 19:
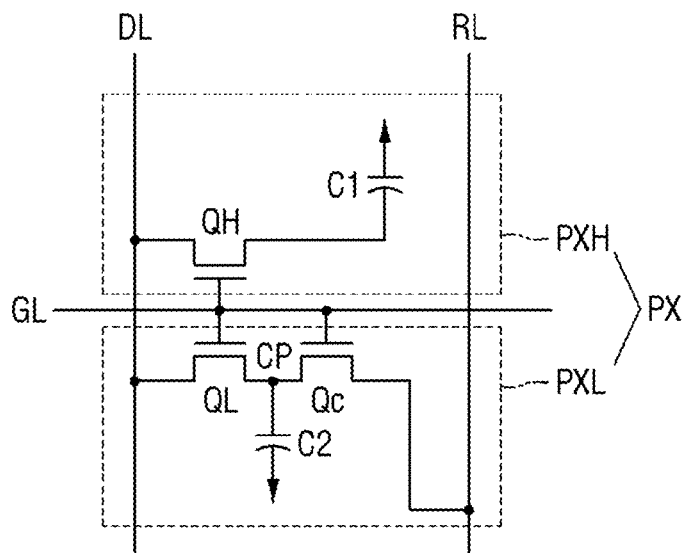
FIG. 19 is an equivalent circuit diagram of an exemplary embodiment of a pixel of an LCD according to the invention.
Figure 20:
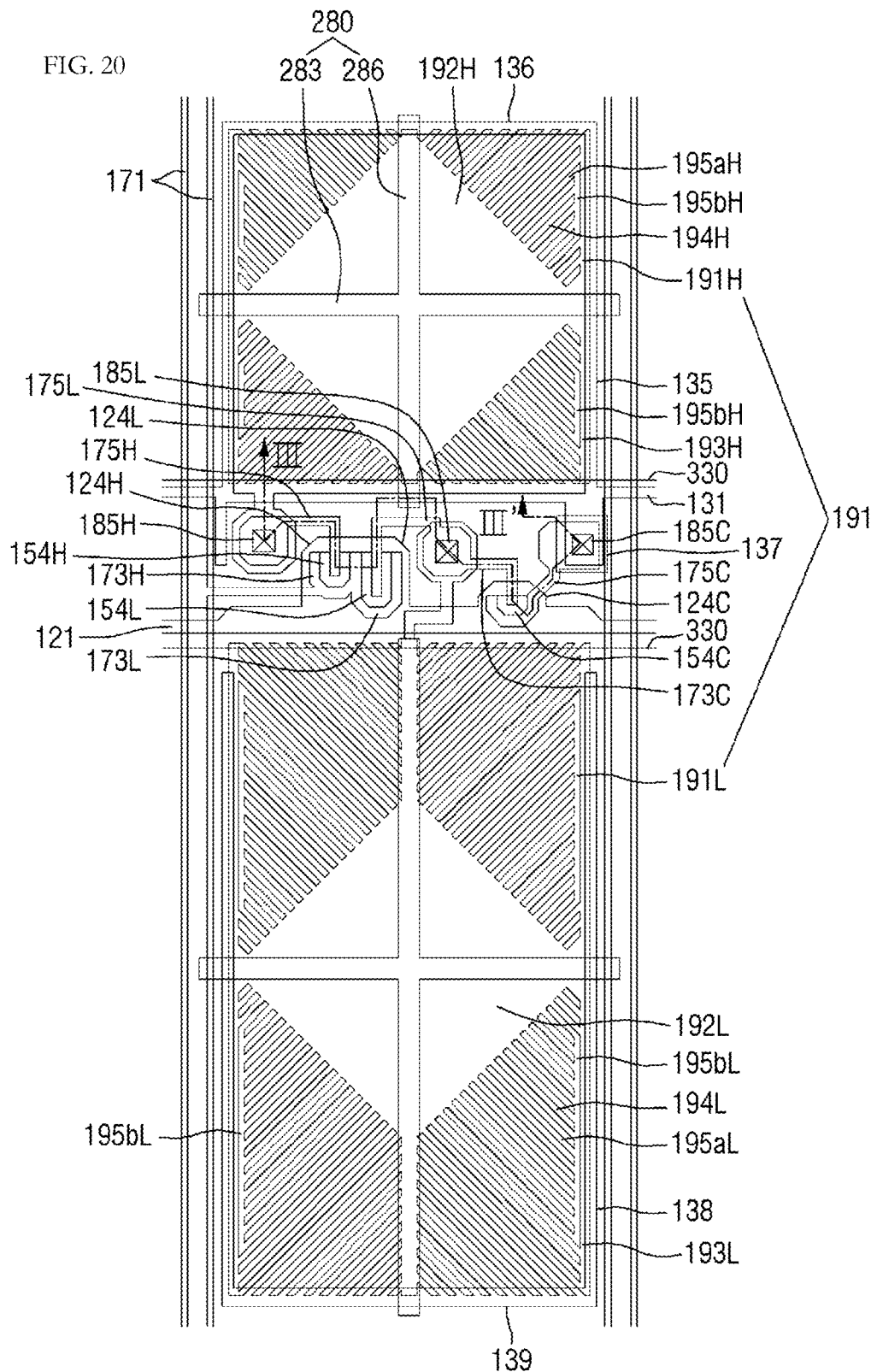
FIG. 20 is a plan view of the pixel of the LCD of FIG. 19.
Figure 21:
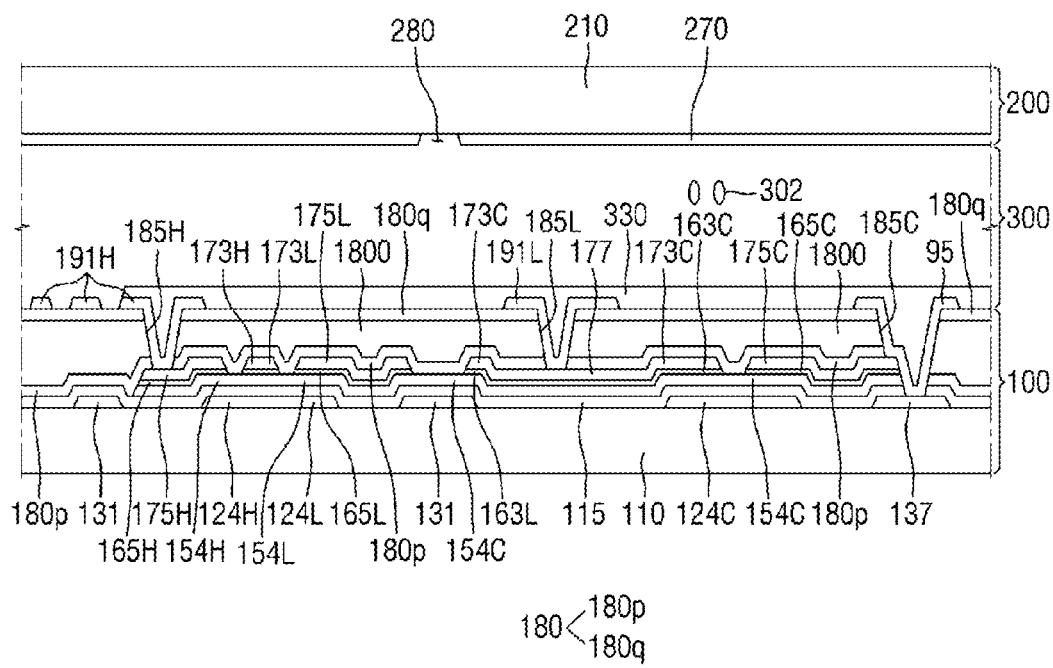
FIG. 21 is a cross-sectional view taken along line of FIG. 20.
Figure 22:
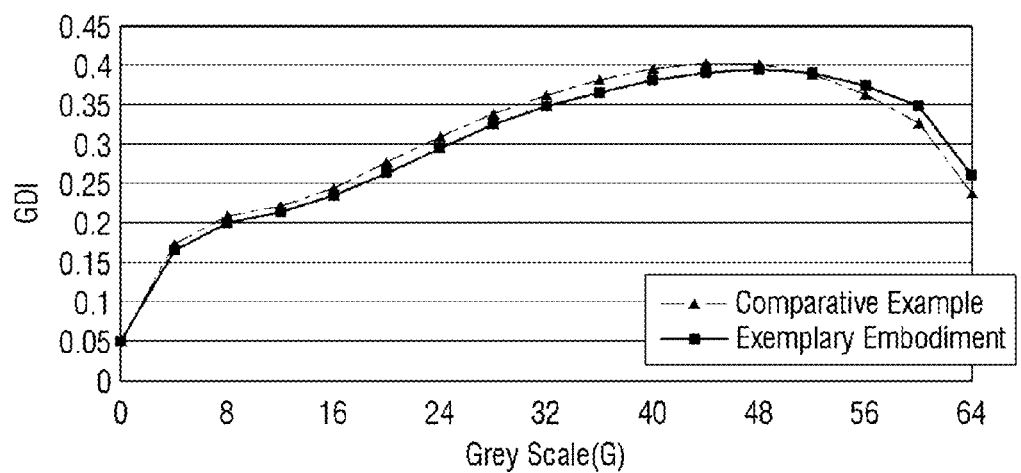
FIG. 22 is a graph showing a gamma curve of the LCD of FIG. 19.

FIG. 19 is an equivalent circuit diagram of a pixel of an LCD according to an exemplary embodiment of the invention, FIG. 20 is a plan view of the pixel of the LCD of FIG. 19, FIG. 21 is a cross-sectional view taken along line of FIG. 20, and FIG. 22 is a graph showing a gamma curve of the LCD of FIG. 19. In the description that follows, FIGS. 1 to 5 will be referred to again for convenience.

FIG. 19 illustrates only one pixel PX, only one gate line GL, only one data line DL, and only one reference voltage line RL for convenience. However, in reality, a plurality of pixels may be arranged in a matrix of rows and columns, and may be respectively disposed near the intersections between a plurality of gate lines 121, which extend in a row direction, and a plurality of data lines 171, which extend in a column direction.

Referring to FIGS. 19 and 20, a pixel PX of an LCD 1 may include first, second and third switching devices QH, QL and Qc, which are implemented as TFTs, and first and second liquid crystal capacitors C1 and C2, which include a dielectric body including a liquid crystal layer 300 (refer to FIG. 2).

The sources (i.e., the input terminals) of the first and second switching devices QH and QL may be connected to the data line DL, the gates (i.e., the control terminals) of the first and second switching devices QH and QL may be connected to the gate line GL, and the gate (i.e., the control terminal) of the third switching device Qc may also be connected to the gate line GL.

A junction CP between the drain of the second switching device QL and the source of the third switching device Qc may be connected to a second sub-pixel electrode 191L of the second liquid crystal capacitor C2, and the drain (i.e., the output terminal) of the first switching device QH may be connected to a first sub-pixel electrode 191H of the first liquid crystal capacitor C1. Second ends of the first and second liquid crystal capacitors C1 and C2 may be connected to a common electrode. The drain (i.e., the output terminal) of the third switching device Qc may be connected to a sustain voltage line 131. The second sub-pixel electrode 191*b* may be electrically connected to the partial pressure reference voltage line RL via the third switching device Qc.

In response to a gate-on signal Von being applied to the gate line GL, the first, second, and third switching devices QH, QL. and Qc, which are connected to the gate line GL, may be turned on. Accordingly, a data voltage applied to the data line DL may be applied to the first sub-pixel electrode 191H via the first switching device QH that is turned on. The voltage applied to the second sub-pixel electrode 191L may be divided by the third switching device Qc, which is connected in series to the second switching device QL. As a result, the voltage applied to the second sub-pixel electrode 191L may become lower than the voltage applied to the first sub-pixel electrode 191H.

Thus, the voltage that the first liquid crystal capacitor C1 is charged with may differ from the voltage that the second liquid crystal capacitor C2 is charged with. Since the voltage that the first liquid crystal capacitor C1 is charged with may differ from the voltage that the second liquid crystal capacitor C2 is charged with, the tilt angle of liquid crystal molecules may vary from a first sub-pixel PXH to a second sub-pixel PXL, and as a result, the luminance of the first sub-pixel PXH may differ from the luminance of the second sub-pixel PXL.

Therefore, by appropriately adjusting the voltage that the first liquid crystal capacitor C1 is charged with and the voltage that the second liquid crystal capacitor C2 is charged with, it is possible to make an image viewed from the sides of the LCD 1 become as similar as possible to an image viewed from the front of the LCD 1. That is, the side visibility of the LCD 1 may be improved.

In the illustrated exemplary embodiment, the third switching device Qc, which is connected to the second liquid crystal capacitor C2 and the partial pressure reference voltage line RL, may be provided to make the voltage that the first liquid crystal capacitor C1 is charged with differ from the voltage that the second liquid crystal capacitor C2 is charged with. In an alternative exemplary embodiment, the second liquid crystal capacitor C2 may be connected to a step-down capacitor.

More specifically, in the alternative exemplary embodiment, a third switching device Qc having a first terminal connected to a step-down gate line, a second terminal connected to the second liquid crystal capacitor C2, and a third terminal connected to the step-down capacitor may be provided to allow the step-down capacitor to be charged with part of the electric potential that the second liquid crystal capacitor C2 is charged with, and thus to set the voltage that the first liquid crystal capacitor C1 is charged with and the voltage that the second liquid crystal capacitor C2 is charged with to differ from each other. In another alternative exemplary embodiment, the first and second liquid crystal capacitors C1 and C2 may be connected to different data lines so as to receive different data voltages and thus to set the voltage that the first liquid crystal capacitor C1 is charged with and the voltage that the second liquid crystal capacitor C2 is charged with to differ from each other. Various other methods than those set forth herein may be used to set the voltage that the first liquid crystal capacitor C1 is charged with and the voltage that the second liquid crystal capacitor C2 is charged with to differ from each other.

Referring to FIGS. 20 to 22, an LCD 1 may include first and second panels 100 and 200, which face each other, and the liquid crystal layer 300, which is disposed between the first and second panels 100 and 200.

The first panel 100 includes a first substrate 100, the first, second, and third switching devices QH, QL, and Qc (refer to FIG. 19), a gate line 121, to which the first, second, and third switching devices QH, QL, and Qc are connected, a partial pressure reference voltage line 131, a data line 171, and a pixel electrode 191. The pixel electrode 191 may include the first and second sub-pixel electrodes 191H and 191L.

The partial pressure reference voltage line 131 may include first sustain electrodes 135 and 136 and a reference voltage 137. The partial pressure reference voltage line 131 may also include second sustain electrodes 138 and 139, which are not connected to the partial pressure reference voltage line 131, but overlap the second sub-pixel electrode 191L.

In the first panel 100, a gate conductor including the gate line 121, the partial pressure reference voltage line 131, and the sustain electrode line 135, 136, 138 and 139 may be disposed on the first substrate 110. In an exemplary embodiment, the first substrate 110 may include a plastic material or glass such as, for example, soda lime glass or borosilicate glass.

The gate line 121 and the partial pressure reference voltage line 131 may extend in one direction, for example, a horizontal direction, and may transmit a gate signal. The gate line 121 may include first and second gate electrodes 124H and 124L, which partially protrude from the gate line 121 between the first and second sub-pixel electrodes 191H and 191L, and a third gate electrode 124*c*, which protrude upward. The first and second gate electrodes 124H and 124L may be unitary to provide a single protrusion.

In the exemplary embodiment, a step-down gate line, which is different from the gate line 121, may also be provided.

The partial pressure reference voltage line 131 may extend in the horizontal direction and may transmit a predefined voltage such as a common voltage. The partial pressure reference voltage line 131 may include the first sustain electrodes 135 and 136 and the second sustain electrodes 138 and 139, which extend downward.

A first vertical sustain electrode 135, which is one of the first sustain electrodes 135 and 136, may be provided along a vertical edge of the first sub-pixel electrode 191H, and a second vertical sustain electrode 138, which is one of the second sustain electrodes 138 and 139, may be provided along a vertical edge of the second sub-pixel electrode 191L. A second horizontal sustain electrode 139 may be disposed between a horizontal edge of the second sub-pixel electrode 191L and a horizontal edge of the first sub-pixel electrode 191H, and a first horizontal sustain electrode 136 and the second horizontal sustain electrode 139 may be respectively provided along the horizontal edge of the second sub-pixel electrode 191L and the horizontal edge of the first sub-pixel electrode 191H.

The first vertical sustain electrode 135 and the first horizontal sustain electrode 136 may be provided along the edges of the first sub-pixel electrode 191H and may partially overlap the first sub-pixel electrode 191H, and the second vertical sustain electrode 138 and the second horizontal sustain electrode 139 may be provided along the edges of the second sub-pixel electrode 191L and may partially overlap the second sub-pixel electrode 191L.

The first and second horizontal sustain electrodes 136 and 139 are illustrated in FIG. 20 as being separate from each other. However, the first and second horizontal sustain electrodes 136 and 139 may be electrically connected to the respective horizontal sustain electrodes in the respective vertically neighboring pixels PX to have a shape of a ring and to surround the first and second sub-pixel electrodes 191H and 191L.

The gate line 121, the partial pressure reference voltage line 131, and the sustain electrode line 135, 136, 138, and 139 may include the same material(s) and may be disposed on the same layer. In an exemplary embodiment, the gate line 121, the partial pressure reference voltage line 131, and the sustain electrode line 135, 136, 138, and 139 may include an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), titanium (Ti) or tantalum (Ta).

In an exemplary embodiment, the gate line 121, the partial pressure reference voltage line 131, and the sustain electrode line 135, 136, 138, and 139 may have a multilayer structure including two conductive films having different physical properties, wherein one of the two conductive films may include a low-resistance metal, for example, an Al-based metal, an Ag-based metal, or a Cu-based metal, so as to reduce signal delays or voltage drops in the gate line 121.

A gate insulating layer 115 may be disposed on an entire surface of the first substrate 110 where the gate line 121, the partial pressure reference voltage line 131, and the sustain electrode line 135, 136, 138, and 139 are provided. In an exemplary embodiment, the gate insulating layer 115 may include silicon oxide (SiOx) or a silicon nitride (SiNx), for example.

Semiconductor layers 154H, 154L, and 154C may be disposed on the gate insulating layer 115, and may at least partially overlap gate electrodes 124H, 124L, and 124C. In an exemplary embodiment, the semiconductor layers 154H, 154L, and 154c may include amorphous silicon (a-Si), polycrystalline silicon (poly-Si), or an oxide semiconductor including zinc oxide (ZnO), for example.

A plurality of ohmic contacts (not illustrated) may be disposed on the semiconductor layers 154H, 154L, and 154C. A first ohmic contact (not illustrated) may be disposed on the first semiconductor layer 154H.

A data conductive line may be disposed on the semiconductor layers 154H, 154L, and 154C. The data conductive line may include the data line 171, which extends in a vertical direction to intersect the gate line 121.

The data line 171 may transmit a data signal and may extend mostly in the vertical direction to intersect the gate line 121 and the partial pressure reference voltage line 131. The data line 171 may extend toward the first and second gate electrodes 124H and 124L, and may include first and second source electrodes 173H and 173L, which are connected to each other.

In addition to the first and second source electrodes 173H and 173L, which are connected to the data line 171, the data line 171 may also include a first drain electrode 175H, which faces, and is isolated from, the first source electrode 173H, a second drain electrode 175L, which faces, and is isolated from, the second source electrode 173L, a third source electrode 173C, which is electrically connected to the second drain electrode 175L, and a third drain electrode 175C, which faces, and is isolated from, the third source electrode 173C.

The ends of the first and second drain electrodes 175H and 175L may be partially surrounded by the first and second source electrodes 173H and 173L. One wide end portion of the second drain electrode 175L may extend to provide the third source electrode 173C. A wide end portion of the third drain electrode 175C may overlap a reference electrode 137 and may be connected to a third contact hole 185C by a connection electrode 95. The end of the third source electrode 173C may be partially surrounded by the third drain electrode 175C having a U-shape.

The semiconductor layers 154H, 154L, and 154C may have substantially the same shape in a plan view as data conductors 171, 175H, 175L, and 175C and resistive contact members 165H, 165L, and 165C, which are disposed below the data conductors 171, 175H, 175L, and 175C, except for in channel areas between the source electrodes 173H, 173L, and 173C and the drain electrodes 175H, 175L, and 175C. That is, the semiconductor layers 154H, 154L, and 154C may be exposed in some areas, for example, between the source electrodes 173H, 173L, and 173C and the drain electrodes 175H, 175L, and 175C, instead of being blocked by the data conductors 171, 175H, 175L, and 175C.

The data line 171 may directly contact the semiconductor layers 154H, 154L, and 154C and may thus provide an ohmic contact. The data line 171 may be a single layer including a low-resistance material so as for the data line 171 to perform the functions of an ohmic contact. In an exemplary embodiment, the data line 171 may include Cu, Al or Ag.

In an exemplary embodiment, to improve the ohmic contact properties of the data line 171 relative to the semiconductor layers 154H, 154L, and 154C, the data line 171 may have a single- or multilayer structure including Ni, Co, Ti, Ag, Cu, Mo, Al, beryllium (Be), niobium (Nb), gold (Au), iron (Fe), selenium (Se), or Ta, for example. As examples of the multilayer structure, a double layer structure may include Ta/Al, Ta/Al, Ni/Al, Co/Al, Mo (or Mo alloy)/Cu, Mo (or Mo alloy)/Cu, Ti (or Ti alloy)/Cu, TiN (or TiN alloy)/Cu, Ta (or Ta alloy)/Cu, or TiOx/Cu, and a triple layer structure may include Ti/Al/Ti, Ta/Al/Ta, Ti/Al/TiN, Ta/Al/TaN, Ni/Al/Ni, or Co/Al/Co, for example.

In an exemplary embodiment, to increase the aperture ratio of a lower substrate where TFTs are provided, the gate line 121 and the data line 171 may both include a transparent conductive material such as indium tin oxide ("ITO"), indium zinc oxide ("IZO"), or Al-doped zinc oxide ("AZO").

The first, second, and third gate electrodes 124H, 124L, and 124C, the first, second, and third source electrodes 173H, 173L, and 173C, and the first, second, and third drain electrodes 175H, 175L, and 175C may provide first, second, and third TFTs QH, QL, and Qc, respectively, together with the first, second and third semiconductor layers 154H, 154L, and 154C, respectively, and the channels of the first, second, and third TFTs QH, QL, and Qc may be provided in the first, second and third semiconductor layers 154H, 154L, and 154C, respectively, between the first, second, and third source electrodes 173H, 173L, and 173C, respectively, and the first, second, and third drain electrodes 175H, 175L, and 175C, respectively.

A protective layer 180 may be disposed on the data conductors 171, 175H, 175L, and 175C and on exposed parts of the semiconductor layers 154H, 154L, and 154C. In an exemplary embodiment, the protective layer 180 may be provided as an inorganic layer or an organic layer. To protect the semiconductor layers 154H, 154L, and 154C, the protective layer 180 may have a double-layer structure including a lower inorganic layer and an upper organic layer or a triple-layer structure including a lower inorganic layer, an organic layer on the lower inorganic layer, and another inorganic layer on the organic layer. A color filter may be used as an organic layer of the protective layer 180.

In an exemplary embodiment, a lower protective layer 180p may be disposed on the data conductors 171, 175H, 175L, and 175C and the exposed parts of the semiconductor layers 154H, 154L, and 154C, and may include an inorganic insulating material such as SiNx or SiOx.

An organic layer may be disposed on the lower protective layer 180p as part of the protective layer 180. A color filter 1800 may be used as the organic layer. The color filter 1800 may extend in the vertical direction along the data line 171, and may display one of the three primary colors (i.e., red, green and blue). The color filter 1800 may overlap the data line 171 from above the data line 171.

An upper protective layer 180q may be disposed on the lower protective layer 180p, which is exposed by the color filter 1800 and one or more openings. The upper protective layer 180q may prevent the color filter 1800 from being detached, and may suppress the contamination of the liquid crystal layer 300 with an organic material such as a solvent that may be introduced from the color filter 1800 so as to prevent defects such as afterimages that may occur during the driving of the LCD 1. In an exemplary embodiment, the upper protective layer 180q may include an inorganic insulating material such as SiNx or SiOx or an organic material.

First and second contact holes 185H and 185L, which expose the ends of the first and second drain electrodes 175H and 175L, respectively, may be provided in the lower protective layer 180p, the color filter 1800, and the upper protective layer 180q.

The pixel electrode 191 is disposed on the upper protective layer 180q. The pixel electrode 191 may be connected to the first and second drain electrodes 175H and 175L via the first and second contact holes 185H and 185L, respectively. In an exemplary embodiment, the pixel electrode 191 may include a transparent conductive material such as ITO or IZO. In response to a voltage being received via the first and second drain electrodes 175H and 175L, the pixel electrode 191 may generate an electric field with a common electrode 270, which is disposed between the first and second panels 100 and 200, and may thus rotate liquid crystal molecules 302 in the liquid crystal layer 300, which is disposed between the first and second panels 100 and 200.

The pixel electrode 191 may receive a data voltage via the TFTs QH, QL, and Qc, which are controlled by a gate signal.

The pixel electrode 191 may be disposed in the pixel PX, which is defined by the gate line 121 and the data line 171.

The pixel electrode 191 may include the first and second sub-pixel electrodes 191H and 191L, which are separated from each other by the gate line 121, are disposed in upper and lower parts, respectively, of a pixel region, and are adjacent to each other in the column direction.

The first sub-pixel electrode 191H may include a central electrode 192H, which is disposed in a central part of the first sub-pixel electrode 191H, and a plurality of fine branches 194H, which diagonally extend from the central electrode 192H, and the second sub-pixel electrode 191L may include a central electrode 192L, which is disposed in a central part of the second sub-pixel electrode 191L, and a plurality of fine branches 194L, which diagonally extend from the central electrode 192L. The fine branches 194H and the fine branches 194L may both include first branch electrodes 194a, second branch electrodes 194b, third branch electrodes 194c, and fourth branch electrodes 194d (refer to FIG. 1).

In addition to the central electrodes 192H and 192L, the fine branches 194H, and the fine branches 194L, the pixel electrode 191 may also include side electrodes 193H and side electrodes 193L, which are disposed along the edges of the pixel PX In the pixel PX, the central electrode 192H, the fine branches 194H, and the side electrodes 193H of the first sub-pixel electrode 191H may be unitary to receive the same voltage, and the central electrode 192L, the fine branches 194L, and the side electrodes 193L of the second sub-pixel electrode 191L may be unitary to receive the same voltage. A plurality of domains may be provided in the pixel PX by horizontal and vertical cutout portions 283 and 286.

The pixel electrode 191, which includes the first and second sub-pixel electrodes 191H and 191L, may include the side electrodes 193H, the side electrodes 193L, first slit patterns 195aH, first slit patterns 195aL, second slit patterns 195bH, and second slit patterns 195bL.

The second panel 200 includes a second substrate 210, which faces the first substrate 110, and the common electrode 270. The common electrode 270 may be disposed on the second substrate 210, which includes a transparent glass or plastic material.

A light-blocking member 330 and the color filter 1800 may be disposed on the first panel 100 or may be selectively disposed on the second panel 200. More specifically, the light-blocking member 330, the color filter 1800, an overcoat layer, and a second alignment layer may be provided on the second substrate 210. In the illustrated exemplary embodiment, the color filter 1800 and the light-blocking member 300 are disposed on the first panel 100.

By arranging the color filter 1800 and the light-blocking member 330 on the first substrate 110, a misalignment between wires that may occur in a curved display device may be prevented. Also, in a case when the alignment direction of the liquid crystal molecules 320 is determined using the second alignment layer, disclination lines that may be generated due to misaligned liquid crystal molecules may be prevented.

The arrangement of the light-blocking member 330, the color filter 1800, the overcoat layer, and the second alignment layer on the second substrate 210 will hereinafter be described. The color filter 1800, which is of one of a plurality of colors, may be disposed on the second substrate 210, and the light-blocking member 330 may be disposed along the edges of the color filter 1800. The color filter 1800 may serve as a filter for transmitting light of a predetermined wavelength therethrough, and the light-blocking member 330, which may also be also referred to as a black matrix, may prevent light leakage and the mixing of the color of the color filter 1800 with the colors of other color filters 1800.

The overcoat layer and the second alignment layer may be selectively disposed in the second panel 200. The overcoat layer may be disposed on the entire surface of the second substrate 210 where the color filter 1800 and the light-blocking member 330 are provided. The overcoat layer may include an insulating material and may provide a flat surface. The overcoat layer may be optional.

The common electrode 270 may be disposed on the overcoat layer. The second alignment layer may be disposed on the common electrode 270. The second alignment layer may be a vertical alignment layer. The second alignment layer may be optional.

A cutout 280 including a first cutout portion 283, which is provided by partially cutting out the common electrode 270 in the horizontal direction, and a second cutout portion 286, which is provided by partially cutting out the common electrode in the vertical direction, may be provided in the common electrode 270. The first and second cutout portions 283 and 286 may have the shape of a cross in a plan view, and may extend beyond the edges of the first and second sub-pixel electrodes 191H and 191L. Since the cutout 280 of the common electrode 270 may extend beyond the edges of the pixel electrode 191, a horizontal electric field may stably reach the sides of the pixel PX, and accordingly, the alignment of the liquid crystal molecules 302 may be also properly adjusted in areas along the sides of the pixel PX.

In an exemplary embodiment, the width of the first and second cutout portions 283 and 286 may be about three times or less the thickness of the liquid crystal layer 300, i.e., the cell gap of the LCD 1. In an exemplary embodiment, the width of the first and second cutout portions 283 and 286 may be in the range of about 2 μm to about 5 μm, for example.

The first and second sub-pixel electrodes 191H and 191L may be connected to the first and second drain electrodes 175H and 175L, respectively, via the first and second contact holes 185H and 185L, respectively, and may thus receive a data voltage from the first and second drain electrodes 175H and 175L, respectively.

The sides of each of the fine branches 194 may distort an electric field and may thus generate horizontal electric field components that determine the alignment direction of the liquid crystal molecules 302. The horizontal electric field components may move the liquid crystal molecules 302 and may thus align the liquid crystal molecules 302 in directions parallel to the longitudinal directions of the first branch electrodes 194a, the second branch electrodes 194b, the third branch electrodes 194c, and the fourth branch electrodes 194d. Accordingly, as discussed above with reference to FIGS. 1 to 5, the liquid crystal molecules 302 may be tilted in the directions parallel to the longitudinal directions of the first branch electrodes 194a, the second branch electrodes 194b, the third branch electrodes 194c, and the fourth branch electrodes 194d. Since the pixel electrode 191 may include four different domains, i.e., first to fourth domains Da to Dd that differ from one another in terms of the longitudinal direction of the fine branches 194, the liquid crystal molecules 302 may be tilted in about four directions, and four domains that differ from one another in terms of the alignment direction of the liquid crystal molecules 302 may be provided in each sub-pixel.

Liquid crystal molecules 302 unevenly aligned along the edges of each domain may also be realigned in a direction similar to a direction of an average azimuth angle 310 with the use of the second slit patterns 195bL and the second slit patterns 195bH.

The direction in which the liquid crystal molecules 302 are tilted may be diversified from one domain to another domain, and in each domain, the liquid crystal molecules 302 may be aligned to have the average azimuth angle 310. Accordingly, the viewing angle of the LCD 1 may be improved.

Referring to FIG. 22, the LCD 1 may reduce grayscale inversion not only through the distortion of an electric field, but also through the alignment of the liquid crystal molecules and the modulation of voltages with the geometric surface structure thereof. Grayscale inversion may be indicated by a gamma curve.

The gamma curve may be defined by the following equation:

$$\frac{\Delta Li}{\Delta Gi}\text{Side} \bigg/ \frac{\Delta Li}{\Delta Gi}\text{Front}.$$

The gamma curve may show the variation of luminance, at the front of the LCD 1, with grayscale.

Accordingly, the variation of luminance, at sides of the LCD 1, with grayscale may be determined.

As illustrated in FIG. 22, the difference in luminance between the sides and the front of the LCD 1 may be reduced, and as a result, the distortion of the gamma curve (a difference between the side visibility and the front visibility of the LCD 1) may be reduced. That is, the transmittance and the visibility of the LCD 1 may be improved, and as a result, the distortion of the gamma curve may be reduced.

While the invention has been particularly shown and described with reference to exemplary embodiments thereof, it will be understood by those of ordinary skill in the art that various changes may be made therein without departing from the spirit and scope of the invention as defined by the following claims. The exemplary embodiments should be considered in a descriptive sense only and not for purposes of limitation.

Although certain exemplary embodiments and implementations have been described herein, other embodiments and modifications will be apparent from this description. Accordingly, the invention is not limited to such exemplary embodiments, but rather to the broader scope of the presented claims and various obvious modifications and equivalent arrangements.

What is claimed is:
1. A liquid crystal display comprising:
a first panel including a first electrode, which comprises side electrodes which are disposed in edge areas of a pixel, a central electrode which is connected to the side electrodes and is disposed in a central area of the pixel, and fine branches, some of which are connected to the side electrodes;
a second panel in which a cutout, which corresponds to the first electrode and divides the fine branches, the central electrode and the side electrodes into a plurality of domains, is defined and which includes a second electrode, which is separated by the cutout and corresponds to each of the plurality of domains; and
a liquid crystal layer disposed between the first and second panels and including liquid crystal molecules,
wherein the fine branches are disposed in each of the plurality of domains and include a plurality of branch electrodes, and first slit patterns, which are provided by removing parts of the pixel between the plurality of branch electrodes and separate the plurality of branch electrodes from one another are defined in the plurality of branch electrodes, and
wherein second slit patterns, which are provided by partially cutting out ends of the fine branches, separate the side electrodes and the fine branches from each other, and extend in parallel to a longitudinal direction of the side electrodes, are defined in the first panel.

2. The liquid crystal display of claim 1, wherein the plurality of branch electrodes and the first slit patterns in one of the plurality of domains are asymmetrical to a plurality of branch electrodes and first slit patterns in another one of the plurality of domains.

3. The liquid crystal display of claim 1, wherein the side electrodes are disposed on at least one of left, right, top and bottom sides of the pixel, and the second slit patterns, which separate the side electrodes and the fine branches from each other, are disposed in at least one of the plurality of domains.

4. The liquid crystal display of claim 1, wherein a width of the side electrodes and the second slit patterns is in the range of about 7 micrometers to about 9 micrometers.

5. The liquid crystal display of claim 1, wherein a distance between the side electrodes and the plurality of branch electrodes is in the range of about 3 micrometers to about 5 micrometers.

6. The liquid crystal display of claim 1, wherein a width of the second silt patterns is in the range of about 3 micrometers to about 5 micrometers.

7. The liquid crystal display of claim 1, wherein the plurality of branch electrodes and the first slit patterns are disposed at a pitch of about 6 micrometers to about 10 micrometers.

8. The liquid crystal display of claim 1, wherein a length of the fine branches extend from one side of the central electrode to one side of the pixel is about 30 micrometers or less.

9. The liquid crystal display of claim 1, wherein the second slit patterns are disposed between every other pair of branch electrodes.

10. The liquid crystal display of claim 1, wherein the central electrode is provided in one of a polygonal shape, including the shapes of a cross, a rhombus, a rectangle, and an octagon, a circular shape and a combination thereof.

11. The liquid crystal display of claim 1, wherein the plurality of branch electrodes and the first slit patterns in one of the plurality of domains are arranged in an alternate manner in a pair of adjacent domains of the plurality of domains.

12. The liquid crystal display of claim 1, wherein a horizontal cutout portion, which horizontally divides the plurality of domains across the central electrode, and a vertical cutout portion, which intersects the horizontal cutout portion and vertically divides the plurality of domains across the central electrode are defined in the second electrode.

13. The liquid crystal display of claim 12, wherein the first electrode further includes a connecting electrode which is disposed between the central electrode and the side electrodes and in an area corresponding to the cutout.

14. The liquid crystal display of claim 11, wherein a width of the cutout is in the range of about 2 micrometers to about 5 micrometers.

15. The liquid crystal display of claim 1, wherein the first electrode further includes first areas in which parts of the fine branches adjacent to the central electrode are located and second areas which are apart from the central electrode and in which at least one of the side electrodes is disposed at the ends of at least one of the fine branches, and the second slit patterns are disposed near at least one of the second areas and rotate liquid crystal molecules in the second areas in a direction similar to a direction of an average azimuth angle of liquid crystal molecules in the first areas.

16. The liquid crystal display of claim 14, wherein a direction in which the plurality of branch electrodes extend is the same as a direction of an average azimuth angle of the liquid crystal molecules.

17. The liquid crystal display of claim 1, further comprising:

first and second polarizing plates, which are disposed on the first and second panels, respectively, wherein a direction in which the plurality of branch electrodes extend is in a range of angles of about 30 degrees to about 60 degrees relative to a polarization axis of the first and second polarizing plates.

18. The liquid crystal display of claim 1, wherein the second slit patterns are arranged in an alternate manner in a pair of adjacent pixels.

19. The liquid crystal display of claim 1, wherein a width of the plurality of branch electrodes is the same as a width of the first silt patterns.

* * * * *